(12) United States Patent
Mori et al.

(10) Patent No.: US 7,176,598 B2
(45) Date of Patent: Feb. 13, 2007

(54) BRUSHLESS DC MOTOR

(75) Inventors: Sadaaki Mori, Mie (JP); Hirohide Inayama, Nara (JP); Atsushi Ishihara, Oxford (GB); Tomofumi Takahashi, Aichi (JP); Minoru Kitabayashi, Aichi (JP); Tetsuo Horie, Aichi (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/055,649

(22) Filed: Feb. 11, 2005

(65) Prior Publication Data

US 2005/0134134 A1 Jun. 23, 2005

Related U.S. Application Data

(62) Division of application No. 10/233,656, filed on Sep. 4, 2002, now Pat. No. 6,867,526.

(30) Foreign Application Priority Data

| Sep. 5, 2001 | (JP) | ............ P2001-268559 |
| Oct. 2, 2001 | (JP) | ............ P2001-306158 |
| Nov. 9, 2001 | (JP) | ............ P2001-344929 |

(51) Int. Cl.
H02K 21/12 (2006.01)

(52) U.S. Cl. .................... 310/156.57

(58) Field of Classification Search .............. 310/156.01–156.84
See application file for complete search history.

(56) References Cited

U.S. PATENT DOCUMENTS

| 5,097,166 A | 3/1992 | Mikulic |
| 5,990,592 A * | 11/1999 | Miura et al. ........... 310/156.53 |
| 6,025,667 A | 2/2000 | Narita et al. |
| 6,034,459 A * | 3/2000 | Matsunobu et al. ... 310/156.38 |
| 6,177,745 B1 | 1/2001 | Narita et al. |
| 6,218,753 B1 | 4/2001 | Asano et al. |

(Continued)

FOREIGN PATENT DOCUMENTS

| EP | 0 657 984 A1 | 6/1995 |
| EP | 0 905 858 A1 | 3/1999 |
| JP | 2000-14058 | 1/2000 |

OTHER PUBLICATIONS

European Search Report dated Mar. 31, 2006.
European Search Report dated Jun. 26, 2006.

*Primary Examiner*—Darren Schuberg
*Assistant Examiner*—Nguyen N. Hanh
(74) *Attorney, Agent, or Firm*—McGinn IP Law Group, PLLC

(57) ABSTRACT

A bridge (8) in conformity with a tooth opening angle of the stator (1) is provided between a permanent magnet (5) and a permanent magnet (5) in a rotor (4), so that a magnetic flux for a reluctance torque is made to pass an inner side of the permanent magnet (5). An opening angle of each of ribs (7) on both sides of the permanent magnet (5) is set to be equal to or smaller than the teeth interval opening angle and equal to or larger than a half thereof. Thereby, reluctance of the rib (7) against a magnetic flux in a circumferential direction is increased and leakage of the magnetic flux of the permanent magnet (5) is prevented.

10 Claims, 25 Drawing Sheets

U.S. PATENT DOCUMENTS

| | | |
|---|---|---|
| 6,239,525 B1 | 5/2001 | Matsunobu et al. |
| 6,340,857 B2 | 1/2002 | Nishiyama et al. |
| 6,703,744 B2 | 3/2004 | Yoshinaga et al. |
| 6,774,521 B2 * | 8/2004 | Inayama et al. ....... 310/156.53 |
| 6,858,961 B2 | 2/2005 | Tagome et al. |
| 6,867,526 B2 | 3/2005 | Mori et al. |

* cited by examiner

BRUSHLESS DC MOTOR

The present Application is a Divisional Application of U.S. patent application Ser. No. 10/233,656, filed on Sep. 4, 2002 now U.S. Pat. No. 6,867,526.

BACKGROUND OF THE INVENTION

The present invention relates to a brushless DC motor having a permanent magnet at a rotor thereof. Further in details, the invention relates to a brushless DC motor utilizing a reluctance torque for effectively utilizing the reluctance torque while preventing a cogging torque from increasing as less as possible.

Conventionally, there is a brushless DC motor of this kind utilizing a reluctance torque having a constitution shown by, for example, FIG. 47. That is, according to a rotor 101 of a brushless DC motor of the drawing, a permanent magnet 102 is arranged on an inner side of an outer periphery to some degree. Therefore, a magnetic region 103 is present between the outer periphery of the rotor 101 and the permanent magnet 102. In driving the motor, as shown by an arrow mark of "q axis" in the drawing, a magnetic flux produced by a stator passes through the magnetic region 103 of the rotor 101. The magnetic flux generates a reluctance torque. Meanwhile, a magnetic flux produced by the permanent magnet 102 also passes through the magnetic region 103 ("d axis" in the drawing). The magnetic flux generates a magnet torque. Further, in the drawing a stator coil and a lower half of the motor are omitted (similar to other drawing of the same kind).

However, according to the above-described conventional brushless DC motor utilizing the reluctance torque, there poses a problem explained below. That is, according to the brushless DC motor, as mentioned above, a magnetic path is commonly used by the magnetic flux produced by the permanent magnet 102 and the magnetic flux produced by the stator (magnetic region 103). The following unpreferable various phenomena are brought about thereby. Further, the phenomena are similar also in a brushless DC motor of a type providing a plurality of rows of permanent magnets at respective magnetic poles of a rotor as shown by FIG. 48.

First, it is pointed out that the magnetic region 103 is significantly magnetized. Therefore, the magnetic region 103 is liable to fall into magnetic saturation. When the magnetic saturation is brought about, the torque of the motor is not proportional to magnetic excitation of a stator coil and is not increased considerably. Therefore, the energy efficiency is poor. Therefore, a characteristic of the motor is deteriorated and vibration or noise by harmonics are increased by that amount.

Further, since the magnetic path is commonly used by the two magnetic fluxes, when some measure is taken with regard to one of the magnetic torque and the reluctance torque, an influence is effected on the other thereby. For example, when there is taken a measure of reducing a cogging torque component of the magnet torque, a magnitude of the reluctance torque or a torque waveform is influenced thereby. Or, when the reluctance torque is intended to be increased, a magnitude of the magnet torque or the torque waveform is conversely influenced thereby. Therefore, design of the motor is very difficult.

Further, there also poses a problem that a magnetic flux density distribution becomes uniform at a gap between the rotor and the stator. An explanation will be given of the problem in reference to a graph of FIG. 49. The abscissa of the graph designates an angle around an axis of the brushless DC motor of FIG. 47. A section A of the angle designates an angular range in correspondence with the single permanent magnet 102 in the rotor 101. Meanwhile, the ordinate designates a magnetic flux density. Further, a broken line designates a magnetic flux density distribution in no load time (when the stator is not excited). A bold line designates a magnetic flux density distribution in load time (when the stator is excited). According to the graph, in no load time (broken line), the magnetic flux distribution is substantially uniform in the section A. In contrast thereto, in load time (bold line), the magnetic flux distribution is deviated even in the section A. The deviation is caused by influence of the magnetic flux of the q axis. That is, because even in the angular range in correspondence with the single permanent magnet 102, at a right half thereof and a left half thereof, at one of them, the magnetic flux is strengthened and at other thereof, the magnetic flux is weakened. The more strengthened the excitation current of the stator in order to achieve a strong torque, the more significant is a warp of the magnetic flux distribution.

Further, according to the brushless DC motor of FIG. 47, a leakage magnetic flux flowing from one permanent magnet to a contiguous permanent magnet without interlinking with the stator coil, is so large that the leakage magnetic flux cannot be disregarded. This signifies that magnetic force of the permanent magnet cannot be made full use as the magnet torque.

According to a conventional brushless DC motor, a torque function is promoted by increasing an amount of using magnets in a rotor as large as possible. For example, according to a rotor shown in FIG. 50, an effective magnetic pole opening angle of a magnet is set to be near to almost 180° in electric angle. Thereby, the magnetic flux is increased and a torque function is ensured by a magnet torque.

However, according to the above-described conventional technology, there poses the following problem. That is, the higher the torque of the brushless DC motor is intended to achieve, the larger the number of magnets are needed. The fact constitutes a factor of cost. Further, when the motor is of a type in which a magnetic member of a rotor is present on an outer side of a magnet as shown by FIG. 50 for utilizing a reluctance torque, there also poses the following problem. That is, a magnetic path is commonly used by a magnetic flux related to a magnet torque and a magnetic flux related to a reluctance torque. Therefore, the magnetic member at the commonly used portion is liable to fall to magnetic saturation. Due to the fact, there is a case in which a torque in proportion to excitation is not achieved. Further, a magnetic flux distribution in an air gap between a rotor and a stator, becomes significantly nonuniform due to the magnetic flux related to the reluctance torque. The fact deteriorates properties of the motor and causes vibration or noise by harmonics.

SUMMARY OF THE INVENTION

The invention has been carried out in order to resolve the above-described problem of the conventional brush DC motor utilizing the reluctance torque. That is, it is an object of the invention to separate a magnetic path by a magnetic flux of a magnetic torque and a magnetic flux of a reluctance torque to thereby exclude adverse influence produced by mutual influence of the magnetic fluxes. Further, it is an object of invention to exclude leakage of a magnetic flux of a permanent magnet as less as possible to make full use of the magnetic flux as a magnet torque.

Another object of the invention is to provide a brushless DC motor capable of achieving a necessary torque without using so many number of magnets and alleviating both of the problem of magnetic saturation and the problem of nonuniformity of magnetic flux density.

In order to solve the aforesaid object, the invention is characterized by having the following arrangement.

(1) A brushless DC motor comprising
a rotor attached with permanent magnets at equal pitches in a circumferential direction, the rotor including,
a bridge connecting a portion on an inner side of the permanent magnet and a portion on an outer side thereof, and
a rib disposed between an end portion in the circumferential direction of an effective magnetic pole opening angle of the permanent magnet and a front end of the bridge along a side edge thereof; and
a stator including a plurality of teeth aligned at equal pitches in the circumferential direction, and a plurality of slots defined between adjacent teeth,
wherein an opening angle $\theta r$ produced by viewing the bridge from a center of the rotor, is equal to or larger than a tooth width opening angle $\theta th$ in the stator and equal to or smaller than an angle constituting an unexcited section of the stator in driving the motor.

(2) The blushless DC motor according to (1), wherein the bridge opening angle $\theta r$ is set to an angle determined by the following equation:

$$\theta r = (\theta tp \times n) + \theta th$$

where
$\theta tp$: a slot pitch angle
$\theta th$: the tooth width opening angle
n: 0 or a natural number.

(3) The brushless DC motor according to (1), wherein a rib opening angle $\theta d$ produced by viewing the rib from the center of the rotor, falls in a range specified by the following equation:

$$0.5 \times \theta op \leq \theta d \leq \theta op$$

where $\theta op$: an opening angle between the adjacent teeth in the stator.

(4) A brushless DC motor comprising
a rotor attached with permanent magnets at equal pitches in a circumferential direction, the rotor including,
a bridge connecting a portion on an inner side of the permanent magnet and a portion on an outer side thereof, and
a rib disposed between an end portion in the circumferential direction of an effective magnetic pole opening angle of the permanent magnet and a front end of the bridge along a side edge thereof; and
a stator including a plurality of teeth aligned at equal pitches in the circumferential direction, and a plurality of slots defined between adjacent teeth,
wherein a rib opening angle $\theta d$ produced by viewing the rib from a center of the rotor, falls in a range specified by the following equation:

$$0.5 \times \theta op \leq \theta d \leq \theta op$$

where $\theta op$: an opening angle between the adjacent teeth in the stator.

(5) A brushless DC motor comprising:
a rotor including a magnet; and
a stator arranged with a plurality of slots at equal pitches in a circumferential direction;
wherein a width in a diameter direction of a rib portion of the rotor does not exceed a value given by the following Equation:

$$\sqrt{\frac{R \times Wm}{Bz/Bm}} \times Lr$$

where,
R: a rate of a leakage magnetic flux at a rib portion to a magnetic flux progressing from the magnet to the stator
Wm: an effective magnetic pole width in circumferential direction
Bz: a saturation magnetic flux density of a magnetic member of the rotor
Bm: a magnetic flux density of the rib portion of the rotor in a radial direction of the rotor
Lr: a length in the circumferential direction of the rib portion.

(6) The brushless DC motor according to (5),
wherein a contribution of a magnet torque to a total torque is larger than a contribution of a reluctance torque to the total torque.

(7) The brushless DC motor according to (5),
wherein a value of Bz/Bm falls in a range of 1.8 through 4.4.

(8) A brushless DC motor comprising:
a rotor having a magnet; and
a stator arranged with a plurality of slots at equal pitches in a circumferential direction;
wherein a width in a diameter direction of a rib portion of the rotor does not exceed a value given by the following Equation:

$$\frac{Q \times Wb}{Bz/Bb} \times \frac{(Lr + Wm)}{Lb}$$

where,
Q: a rate of a leakage magnetic flux at the rib portion to a magnetic flux passing from a tooth of the stator to a bridge of the rotor
Wb: a width in a circumferential direction of the bridge of the rotor
Wm: an effective magnetic pole width in circumferential direction
Bz: a saturation magnetic flux density of a magnetic member of the rotor
Bb: a magnetic flux density of a bridge of the rotor in driving the motor
Lr: a length in the circumferential direction of the rib portion
Lb: a length in a diameter direction of the bridge.

(9) The brushless DC motor according to (8),
wherein a contribution of a magnet torque to a total torque is larger than a contribution of a reluctance torque to the total torque.

(10) The brushless DC motor according to (8),
wherein a value of Bz/Bb falls in a range of 1.8 through 4.4.

(11) A structure of a brushless DC motor comprising:
a rotor having a magnet; and
a stator arranged with a plurality of slots at equal pitches in a circumferential direction;

wherein a width in a diameter direction of a rib portion of the rotor does not exceed a smaller one of a value given by the following Equation 1:

$$\sqrt{\frac{R \times Wm}{Bz/Bm}} \times Lx \qquad \text{Equation 1}$$

and a value given by the following Equation 2:

$$\frac{Q \times Wb}{Bz/Bb} \times \frac{(Lr + Wm)}{Lb} \qquad \text{Equation 2}$$

where,
R: a rate of a leakage magnetic flux at a rib portion to a magnetic flux progressing from the magnet to the stator
Q: a rate of a leakage magnetic flux at the rib portion to a magnetic flux passing from a tooth of the stator to a bridge of the rotor
Wm: an effective magnetic pole width in circumferential direction
Bz: a saturation magnetic flux density of a magnetic member of the rotor
Bm: a magnetic flux density of the rib portion of the rotor in a radial direction of the rotor
Bb: a magnetic flux density of a bridge of the rotor in driving the motor
Lr: a length in the circumferential direction of the rib portion
Wb: a width in the circumferential direction of the bridge of the rotor
Lb: a length in a diameter direction of the bridge.
(12) The structure of a brushless DC motor according to (11) wherein a value Bz/Bm and a value Bz/Bb fall in a range of 1.8 through 4.4.
(13) A brushless DC motor utilizing a reluctance torque comprising:
a rotor including magnets,
wherein an effective magnetic pole opening angle in an air gap of the rotor falls in a range specified by two conditions of an upper limit of 173° and a lower limit of 127° in electric angles.
(14) The brushless DC motor according to (13), wherein the upper limit is 161° and a lower limit is 139° in electric angles.
(15) The brushless DC motor according to (13), wherein
the rotor includes a bridge for connecting an inner periphery and an outer periphery of the magnet by a magnetic member at a position other than the effective magnetic pole opening angle in the rotor, and
an opening angle in an electric angle of the bridge is not smaller than 83.3% of a complementary angle in an electric angle of the effective magnetic pole opening angle in the rotor.
(16) The brushless DC motor according to (15), wherein
the motor is driven by an excitation current having a phase angle advanced relative to a phase of an induced voltage, and
an advancing angle of the phase of the current relative to the phase of the induced voltage falls a range in which a center of the range is defined by a half of the opening angle in the electric angle of the bridge and a width of the range is defined by an opening angle in an electric angle of a width of a tooth constituting an excitation center of a reluctance torque.
(17) A method of driving a brushless DC motor, in which the brushless DC motor includes a rotor having a magnet, an effective magnetic pole opening angle in an air gap of the rotor falls in a range prescribed by two conditions of an upper limit of 173° and a lower limit of 127° in electric angles, the brushless DC motor includes a bridge for connecting an inner periphery and an outer periphery of the magnet by a magnetic member at a portion other than the effective magnetic pole opening angle in the rotor, and an opening angle in an electric angle of the bridge is not smaller than 83.3% of a complementary angle in an electric angle of the effective magnetic pole opening angle in the rotor, the method comprising the steps of:
using an excitation current having a phase angle advanced relative to a phase of an induced voltage; and
setting an advancing angle of a phase of the current relative to the phase of the induced voltage in a range in which a center of the range is defined by a half of the opening angle in the electric angle of the bridge and a width of the range is defined by an opening angle in an electric angle of a width of a tooth constituting an excitation center of a reluctance torque.

DETAILED DESCRIPTION OF PREFERRED EMBODIMENTS

First Embodiment

A detailed explanation will be given of embodiments embodying the invention in reference to the attached drawings as follows. The embodiment embodies the invention as a brushless DC motor constituted by a stator having 12 slots and a rotor having 4 poles. According to the embodiment, an angular range of an opening angle used in each of portions of the stator and the rotor, is defined by a portion facing an air gap (inner periphery in the stator, outer periphery in the rotor).

Figure 1:
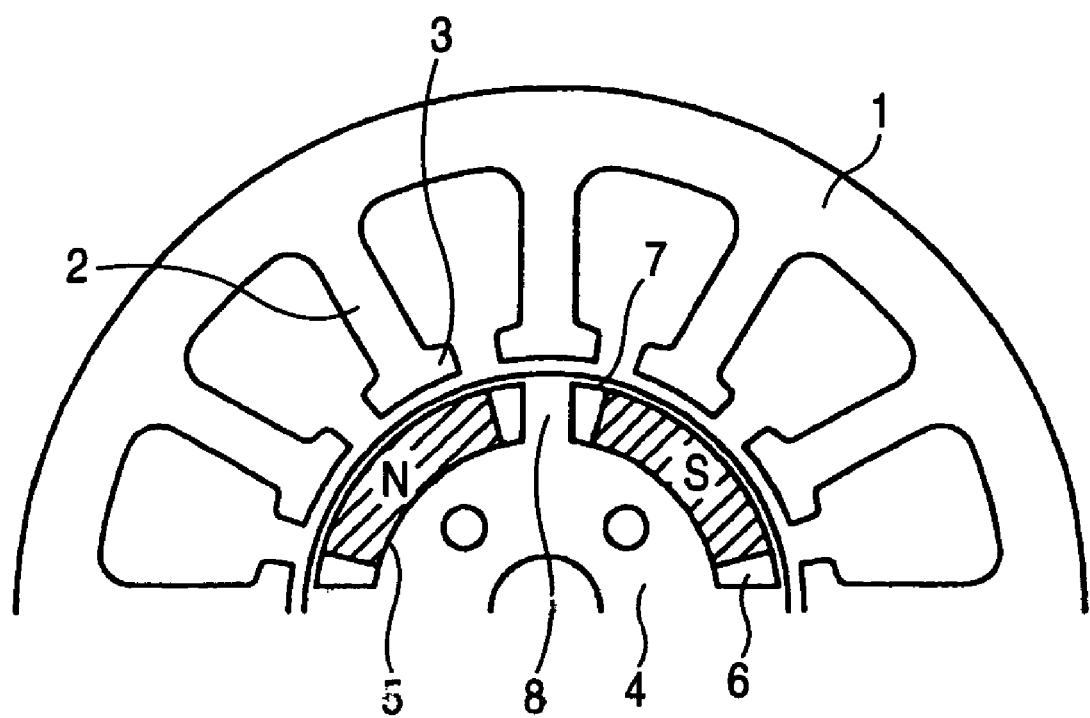
FIG. 1 is a view showing a structure of a brushless DC motor according to a first embodiment.

A brushless DC motor according to the embodiment is constituted by a structure as shown in FIG. 1. A stator 1 of the brushless DC motor is provided with 12 pieces of teeth 2. A front end of the respective tooth 2 is formed with a tip 3. Meanwhile, a rotor 4 is provided with 4 pieces of permanent magnets 5. The respective permanent magnet 5 is formed by a shape of a so-to-speak substantially circular arc along an outer periphery of the rotor 4. A respective magnet attaching hole 6 in the rotor 4 is formed to be longer than the permanent magnet 5 in a circumferential direction. Further, the respective permanent magnet 5 is attached at substantially a center of the respective magnet attaching hole 6 in the circumferential direction. Therefore, there are gaps at both ends of the respective permanent magnets 5. The respective magnet attaching hole 6 is formed to be extremely proximate to the outer periphery of the rotor 4. Therefore, a magnetic member on an outer side of the respective magnet attaching hole 6 is extremely slender. In the specification, a portion of the magnetic member on the outer side of the respective magnet attaching hole 6 on an outer side of the gap at each of the both end portions of the permanent magnet 5 in the circumferential direction, is referred to as a rib 7. There is present a bridge 8 for connecting a central portion of the rotor 4 and the rib 7 between the magnet attaching hole 6 and the magnet attaching hole 6.

An explanation will be given of names of angles of respective portions in the brushless DC motor of FIG. 1 in reference to FIG. 2. That is, a pitch of arranging the permanent magnet 5 in the rotor 4, is referred to as a magnetic pole pitch angle $\theta p$. An angular range occupied by the permanent magnet 5 in view from the center of the rotor 4, is referred to as an effective magnetic pole opening angle $\theta m$. An angular range occupied by the rib 7 in view from the center of the rotor 4, is referred to as a rib opening angle $\theta d$. An angular range occupied by the bridge 8 in view from the center of the rotor 4, is referred to as a bridge opening angle $\theta r1$.

Further, a pitch of arranging a slot in the stator 1, is referred to as a slot pitch angle θtp. An angular range occupied by the tooth 2 of the stator 1 in view from the center of the rotor 4, is referred to as the tooth opening angle θth. Although in FIG. 2, an angular range of a portion of the tooth 2 which does not include the tip 3, is shown as the tooth opening angle θth, as mentioned later in reference to FIG. 5, an angular range including the tips 3 on both sides can also be defined as the tooth opening angle θth. An angular range occupied by an interval between the teeth 2 of the stator 1 in view from the center of the rotor 4, is referred to as a teeth interval opening angle θop. Although in FIG. 2, the interval between the teeth 2 per se excluding the tips 3, is shown as the teeth interval opening angle θop, as mentioned later in reference to FIG. 5, an opening angle of an opening between the tip 3 and the tip 3 (slot opening angle), may be defined as the teeth interval opening angle θop. Further, an angular range occupied by the teeth 2 (here, 2 pieces thereof as mentioned later) simultaneously excited and an opening therebetween in the stator 1, is referred to as an effective excitation opening angle θe and the angle constituting an unexcited section of the stator is shown as θue in FIG. 2. The unexcited section of the stator θue corresponds to the angle that is obtained when the effective excitation openiun angle θe is subtracted from the magnetic pole pitch θp. Similar to the tooth opening angle θth, although in FIG. 2, the range of a portion of the teeth 2 which does not include the tip 3, is shown as an effective excitation opening angle θe, as mentioned later in reference to FIG. 5, an angular range including the tip 3 on both sides can also be defined as an effective excitation opening angle θe.

Figure 3:
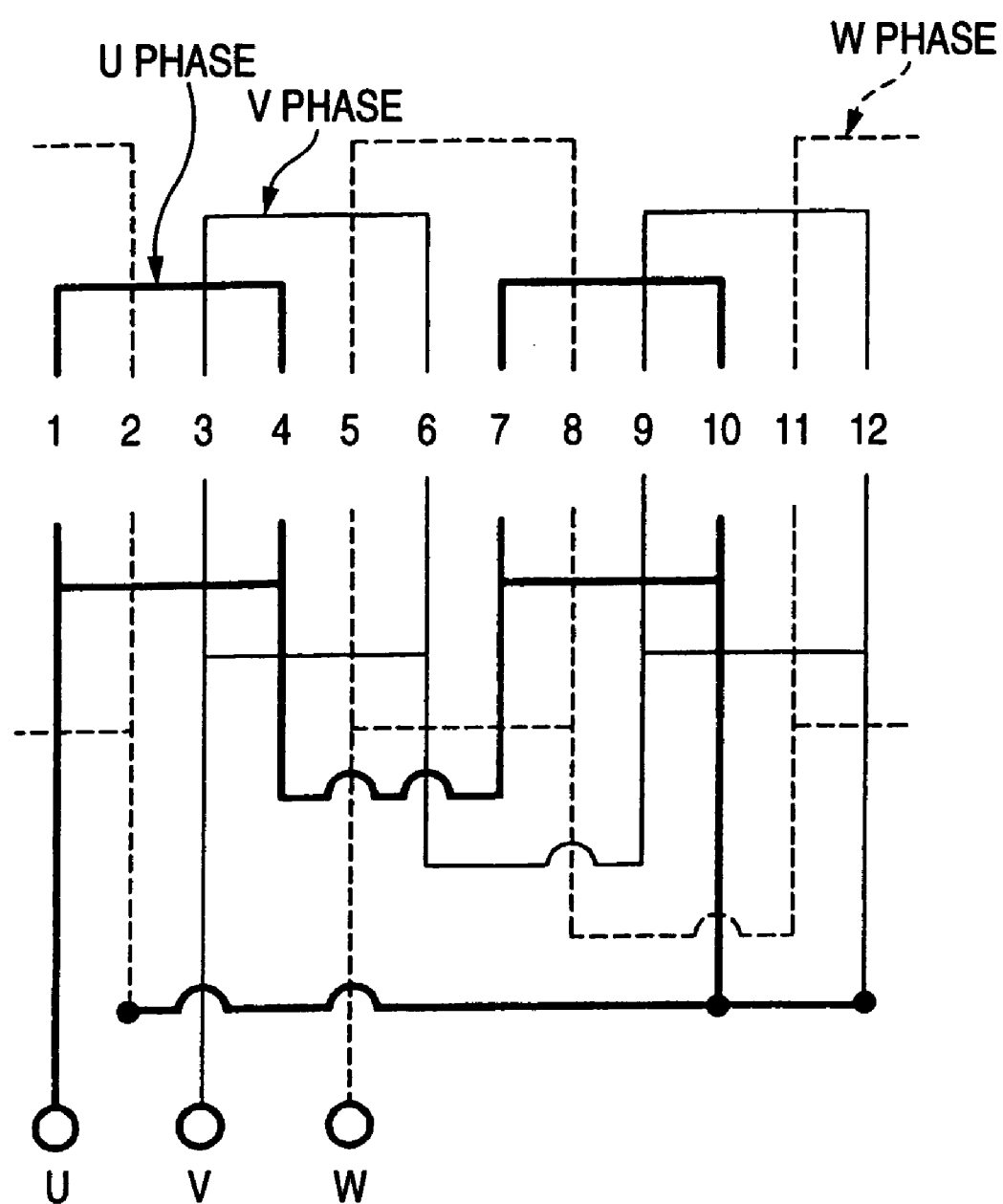
FIG. 3 is a view for explaining windings of the brushless DC motor of FIG. 1.

Next, an explanation will be given of windings in the brushless DC motor in reference to FIG. 3. The windings adopt a winding method referred to as abbreviated winding and a number of phases is 3. Numbers of 1 through 12 in FIG. 3 are numbers of slots in the stator 1. That is, a wire of U phase winds 3 pieces of the teeth 2 from 1-th slot to 4-th slot, further, winds 3 pieces of the teeth 2 from 7-th slot to 10-th slot and reaches a neutral point. A wire of V phase winds 3 pieces of the teeth 2 from 3-th slot to 6-th slot, further, winds 3 pieces of the teeth 2 from 9-th slot to 12-th slot and reaches the neutral point. A wire of W phase winds 3 pieces of the teeth 2 from 5-th slot to 8-th slot, further, winds 3 pieces of the teeth 2 from 11-th slot to 2-th slot and reaches the neutral point. That is, the three phases are wound while being shifted from each other by 2 slot pitch. Further, respective closed loop excites 3 pieces of the teeth 2. According to the brushless DC motor, 6 pieces of the teeth 2 correspond to an electric angle of 360° and therefore, one closed loop ranges an electric angle of 180°. Further, the shift between phases corresponds to an electric angle of 120°.

Figure 4:
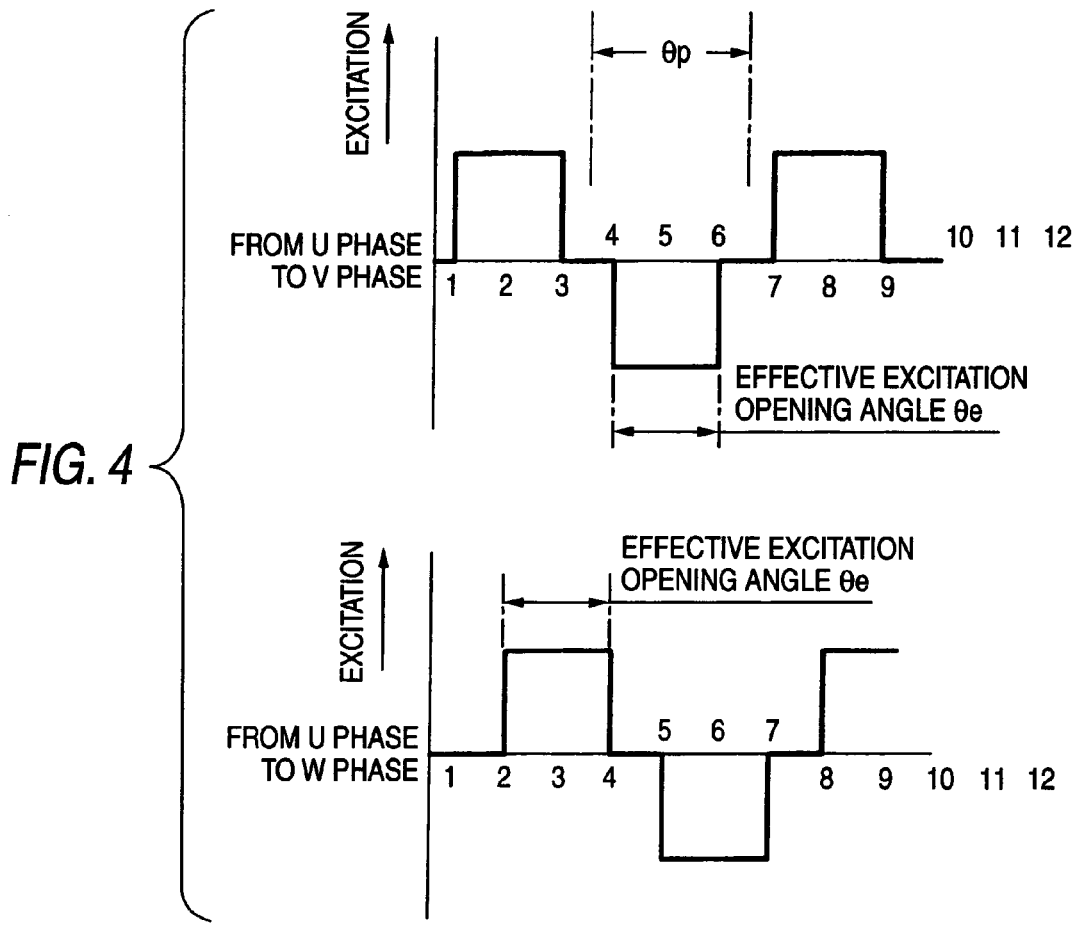
FIG. 4 illustrates diagrams for explaining an excitation situation in the brushless DC motor of FIG. 1.

Here, assume that electricity is conducted from U phase to V phase. Then, at the teeth 2 between 3-th slot and 4-th slot, excitation of two phases are canceled by each other and therefore, the teeth 2 are not excited in a synthesized state. The same goes with the teeth 2 between 9-th slot and 10-th slot. Further, also between 6-th slot and 7-th slot and between the 12-th slot and 1-th slot, the teeth 2 at the positions are not excited. Therefore, the teeth 2 are excited effectively at 4 locations from 1-th slot to 3-th slot, from 4-th slot to 6-th slot, from 7-th slot to 9-th slot and from 10-th slot to 12-th slot respectively by an amount of 2 slot pitches (electric angle of 120°). In the previous explanation of the effective excitation opening angle θe, 2 pieces of the teeth 2 are simultaneously excited from such reason. Naturally, a direction of excitation is alternating. That is, when electricity is conducted from U phase to V phase, there is brought about an excited situation as shown by an upper stage of FIG. 4. A lower stage of FIG. 4 shows a case of conducting electricity from U phase to W phase. The same goes with a case of conducting electricity to other phases. Further, a numeral in the abscissa of FIG. 4 designates a slot number shown in FIG. 3. The ordinate indicates an intensity of excitation generated at respective slot.

Further, in the case of conducting electricity in sine wave, more or less excitation appears also in the unexcited teeth in FIG. 4. However, main excited magnetic poles are invariably constituted by the amount of 2 teeth and the way of specifying the effective excitation opening angle θe is not influenced thereby. In the following explanation, also in consideration of such a case, "nonexcitation" is defined by including of weakly excited teeth relative to the main excited poles.

Referring back to FIG. 1 and FIG. 2, the bridge opening angle θr1 (corresponding to "bridge opening angle θr" in claims) of the rotor 4 is set to be equal to the opening angle θth viewing one tooth 2 in the stator 1 (portion excluding the chip 3). The reason is that a magnetic flux produced by exciting the stator coil is drawn to a portion of the rotor 4 on an inner side of the permanent magnet 5. A description will be given later of the details.

Figure 5:
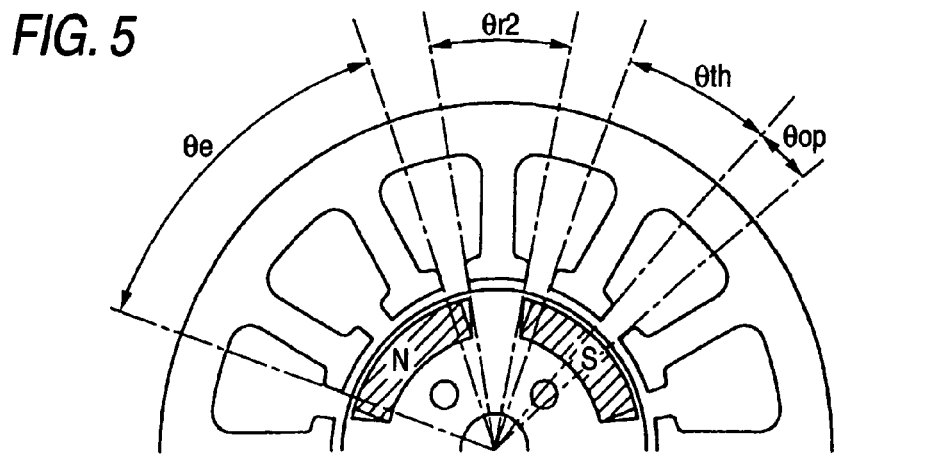
FIG. 5 is a view showing a structure of a brushless DC motor according to a modified example of the first embodiment.
Figure 6:
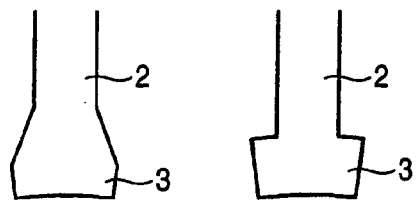
FIG. 6 illustrates views showing variations of shapes of front ends of teeth in a brushless DC motor.

Further, as shown by FIG. 5, the bridge opening angle (corresponding to "bridge opening angle θr in claims) of the rotor may be set to an opening angle θr2 including the tips 3 on the both sides of the tooth 2. Such a setting is particularly effective when the teeth 2 and the tip 3 constitute a smoothly connected shape as shown by FIG. 6 or when the tip 3 is formed thickly in the radius direction. Because in such a case, a magnetic flux produced by the stator coil is diffused in the circumferential direction by the tip 3. Therefore, in such a case, also the effective excitation opening angle θe is to be set to an opening angle including the tips 3 at the both ends.

Figure 2:
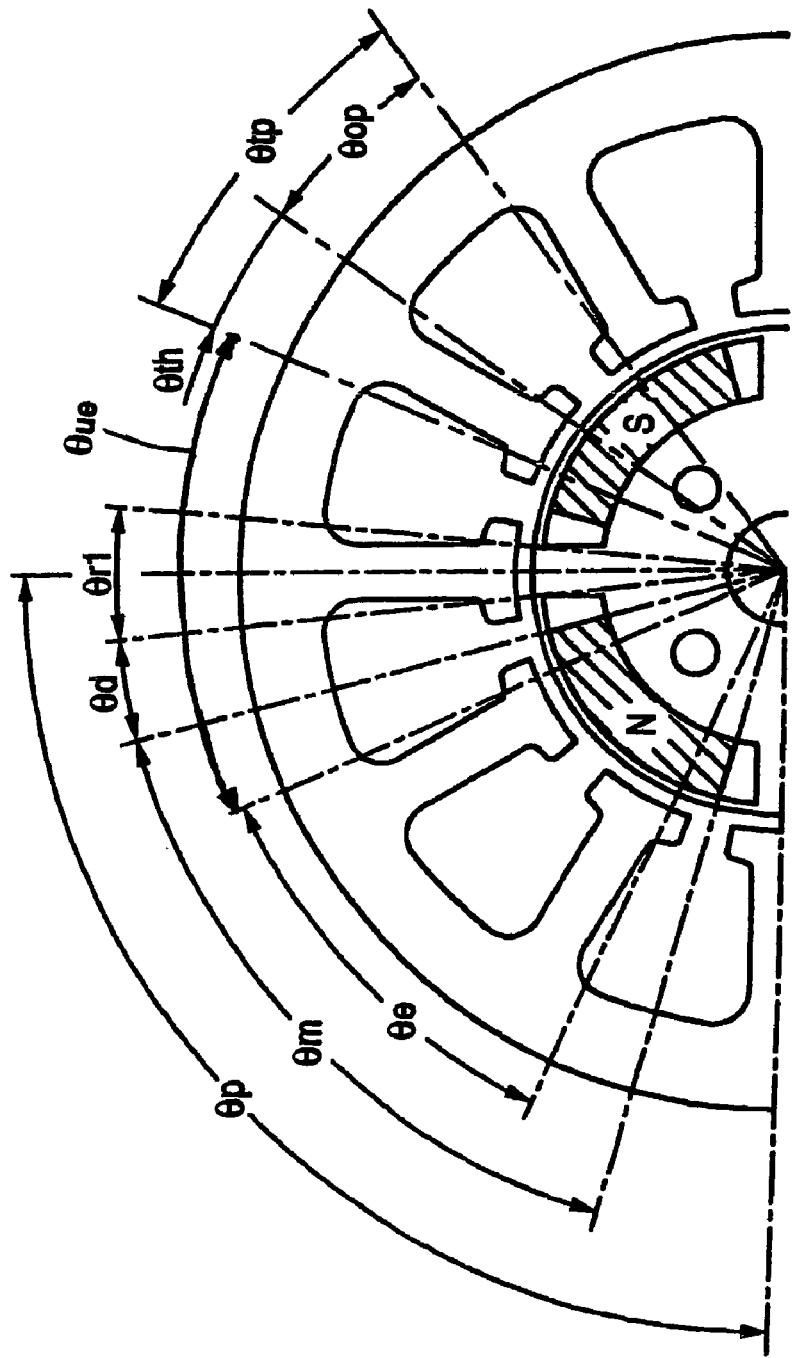
FIG. 2 is a view showing signs of angles of respective portions of the brushless DC motor of FIG. 1.
Figure 7:
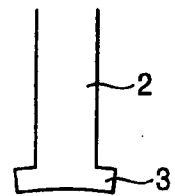
FIG. 7 is a view showing a variation of a shape of a front end of a tooth in a brushless DC motor.

Meanwhile, when the tip 3 is thin in the radius direction and there is a clear notch between the tip 3 and the tooth 2 as shown by FIG. 7, it is effective to set the bridge opening angle θr1 as shown by FIG. 1 and FIG. 2. Because in such a case, a magnetic flux produced by exciting the stator coil is not so much diffused at the chip 3. Therefore, in such a case, also the effective excitation opening angle θe is to be set to the opening angle which does not include the tip 3 at the both ends.

Referring back to FIG. 1 and FIG. 2 again, the rib opening angle θd of the rotor 4 is set to be equal to or smaller than the teeth interval opening angle θop and equal to or larger than a half thereof of the stator 1. Further, the rib 7 is extremely slender in the radius direction. A description will be given later of reason therefor.

Figure 8:
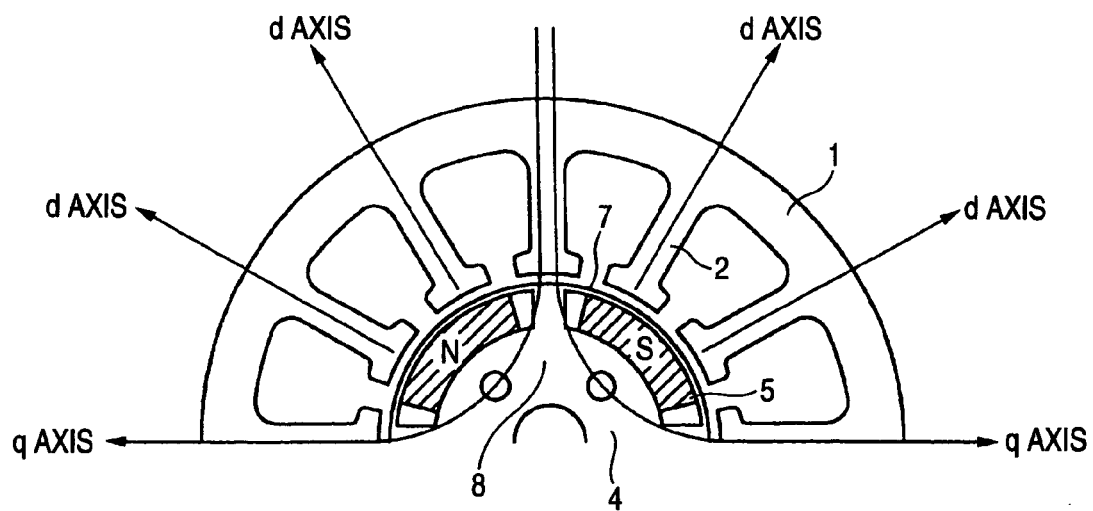
FIG. 8 is a view for explaining magnetic paths in the brushless DC motor of FIG. 1.

According to the brushless DC motor having the above-described constitution, magnetic paths are formed as shown by FIG. 8. That is, the magnetic flux by the permanent magnet 5 ("d axis" in the drawing) traverses the extremely slender magnetic member on the outer side of the permanent magnet 5 in the rotor 4 and comes out to the gap between the rotor 4 and the stator 1. Further, the magnetic flux progresses to the tooth 2 of the stator 1 and is interlinked with the coil. The magnetic flux carries burden of the magnet torque of the brushless DC motor. Meanwhile, when the teeth 2 (tees within the effective excitation opening angle θe) of the stator 1 and the bridges 8 of the rotor 4 are aligned as shown by FIG. 8, the magnetic flux ("q axis" in the drawing) generated by the coil of the stator 1 passes the bridge 8 and enters from the permanent magnet 5 to the inner side and returns to the stator 1 from other bridge 8. The magnetic flux carries burden of the reluctance torque of the brushless DC motor. In this way, the brushless DC motor of the embodiment is of a type of positively utilizing the reluctance torque.

Therefore, the magnetic paths of the two magnetic fluxes are separate. Therefore, there is almost no interference between the two magnetic fluxes and the magnetic member of the rotor 4 does not fall into magnetic saturation. Therefore, the energy efficiency is high. Further, the width of the bridge 8 is set in conformity with the tooth 2 (refer to the above-described explanation of the bridge opening angle θr1) and therefore, there is not a portion at which a sectional area of the magnetic flux path of the q axis is narrowed at inside of the rotor 4. This signifies that reluctance to the magnetic flux of the q axis is small. Therefore, large reluctance torque is provided. Further, when the tooth 2 at a position attached with an arrow mark of "d axis" in FIG. 8, is an excitation pole, the magnetic flux needs to detour to the bridge 8 by passing the rib 7 of the rotor 4 in the circumferential direction. As a result, such a magnetic flux is extremely small.

Figure 9:
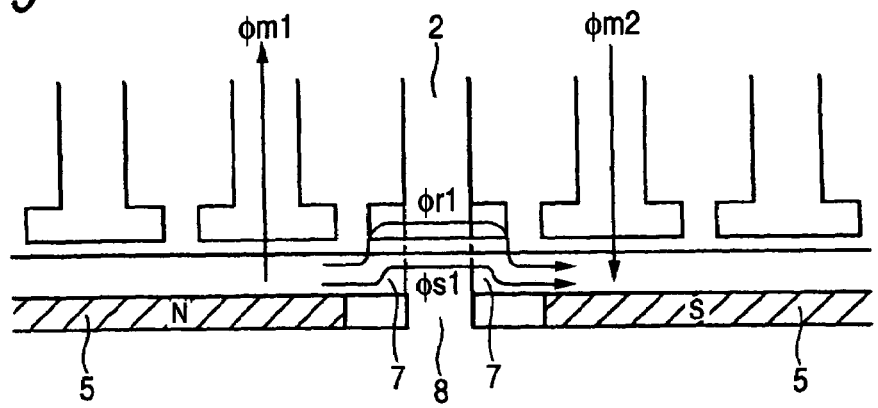
FIG. 9 is a view showing a relationship between magnetic poles of a rotor and teeth of a stator in the brushless DC motor of FIG. 1 by linear development.

Successively, an explanation will be given of a leakage magnetic flux in the magnetic flux produced by the permanent magnet 5 in the brushless DC motor. First, an explanation will be given of a situation when the bridges 8 of the rotor 4 are aligned with the teeth 2 of the stator 1 (FIG. 9). The magnetic flux generated by the permanent magnet 5 passes the teeth 2 of the stator 1 via the gap and is interlinked with the stator coil as shown by arrow marks φm1 and φm2 in FIG. 9. Thereby, the magnetic torque is generated. Here, a portion of the magnetic flux generated by the permanent magnet 5 progresses to contiguous permanent magnet 5 by way of the rib 7, a front of the bridge 8 and the rib 7 as shown by an arrow mark φs1 in FIG. 9. Further, as shown by an arrow mark φr1, there also is a component thereof which progresses to contiguous permanent magnet 5 by way of the rib 7, the gap, the front end of the teeth 2, the gap, and the rib 7.

The magnetic fluxes of the arrow marks φs1 and φr1 progress directly to the contiguous permanent magnet 5 without interlinking with the stator coil and therefore, the magnetic fluxes do not contribute to the magnet torque. Therefore, these are leakage magnetic fluxes. However, both of the magnetic fluxes need to pass the ribs 7 in the circumferential direction. The rib 7 is extremely slender in the radius direction as described above and therefore, reluctance thereof to the magnetic fluxes is very large. Therefore, the leakage fluxes are actually extremely little.

Figure 10:
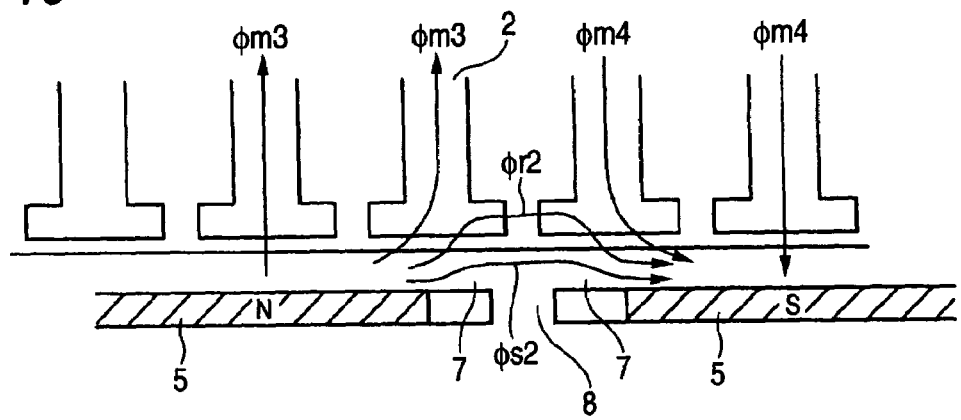
FIG. 10 is a view showing a relationship between the magnetic poles of the rotor and the teeth of the stator in the brushless DC motor of FIG. 1 by linear development.

Next, an explanation will be given of a situation when the bridge 8 of the rotor 4 is aligned with the slot opening of the stator 1 (FIG. 10). Also in this case, a large portion of the magnetic flux generated by the permanent magnet 5 passes the tooth 2 of the stator 1 and is interlinked with the stator coil (arrow marks φm3, φm4). This is the component contributing to the magnet torque. Further, there are leakage magnetic fluxes which do not contribute to the magnet torque as shown by arrow marks φs2 and φr2. The former progresses to contiguous permanent magnet 5 by way of the rib 7, the front end of the bridge 8 and the rib 7. The latter progresses to contiguous permanent magnet 5 by way of the rib 7, the gap, the front end of the tooth 2, the slot opening, the front end of the tooth 2, the gap and the rib 7. However, the leakage magnetic fluxes are axially extremely little. The reason is similar to that in the explanation in reference to FIG. 9. Particularly, the leakage magnetic flux of the arrow mark φr2 is very little. Because the reluctance is larger by an amount of passing the throttle opening.

In this way, according to the brushless DC motor, in the magnetic flux generated by the permanent magnet 5, the leakage magnetic flux component which does not contribute to the magnet torque is extremely little. This signifies that the magnetic force of the permanent magnet 5 can effectively be utilized as torque. Further, that the leakage magnetic flux component is very little, signifies that a variation width by a rotational position of the rotor 4 (difference between the case of FIG. 9 and the case of FIG. 10) is also little. This signifies that the cogging torque produced by the variation of the leakage magnetic flux amount is small. Therefore, a consideration may be given to only a variation by the rotational position of the rotor 4 with regard to the magnetic flux interlinking with the stator coil from the permanent magnet 5 as the cogging torque of the magnetic torque in the brushless DC motor.

Figure 11:
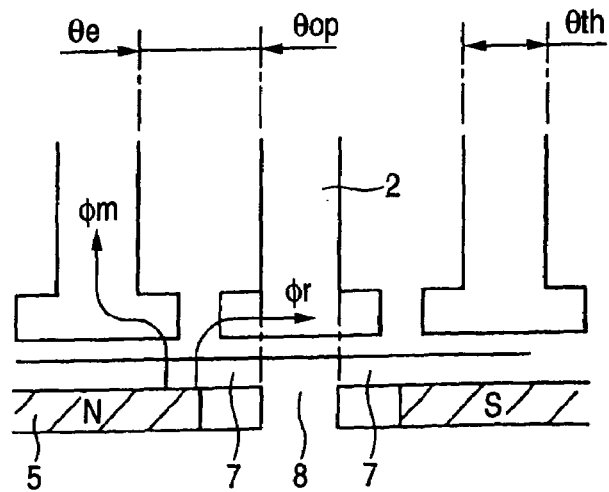
FIG. 11 is a view showing a relationship between the magnetic poles of the rotor and the teeth of the stator in the brushless DC motor of FIG. 1 by linear development.

Further, an explanation will be given of influence of the rib opening angle θd effected on large or small of the leakage magnetic flux in reference to FIG. 11. FIG. 11 shows a situation when the bridges 8 are aligned with the teeth 2 of the stator 1. Under the situation, as described above, a large portion of the magnetic flux from the permanent magnet 5 is interlinked with the stator coil (arrow mark φm), however, there is present the magnetic flux which is not interlinked with the stator coil although the amount is very small (arrow mark φr). In this case, when the rib opening angle θd is smaller than a half of the teeth interval opening angle θop of the stator 1, the magnetic flux φr which is not interlinked with the stator coil is increased. Because the magnetic flux φr flows by constituting a closed circuit by end portions of contiguous ones of the permanent magnets 5 of the rotor 4 in the circumferential direction and the tooth 2 right thereabove.

Therefore, the lib opening angle θd needs to be equal to or larger than the half of the teeth interval opening angle θop. When the rib opening angle θd is made to be equal to or larger than the half of the teeth interval opening angle θop, the magnetic flux φr which is not interlinked with the stator coil becomes negligibly small. Thereby, the leakage magnetic flux amount can be much reduced.

When the rib opening angle θd is conversely made larger than the teeth interval opening angle θop, a total amount of the magnetic flux of the permanent magnet 5 is reduced on one hand and the function of the brushless DC motor is deteriorated. Further, on the other hand, the bridge opening angle θr1 is reduced and reluctance torque cannot effectively be utilized. At any rate, this is not preferable in view of the function of the motor. From the above-described, the rib opening angle θd is set to fall in a range shown below.

$$0.5 \times \theta op \leq \theta d \leq \theta op$$

As a result, according to the brushless DC motor of the embodiment, it is most advantageous in view of the function of the motor that the effective magnetic pole opening angle θm of the rotor 4 and the effective excitation opening angle θe of the stator 1 are substantially equal to each other. Hence, according to the embodiment, assume that the two opening angles are set in this way.

Further, FIG. 11 shows an example of the case of the motor (FIG. 2) in which the bridge opening angle θr of the rotor 4 is set to the opening angle θr1 of the tooth 2 of the stator 1 excluding the tip 3. In the case of the motor in which the bridge opening angle θr of the rotor 4 is set to the opening angle θr2 including the tips 3 on the both sides of the tooth 2, the above-described equation is applied after the teeth interval opening angle θop is set to an opening angle between the tip 3 and the tip 3 (that is, the slot opening angle).

Figure 12:
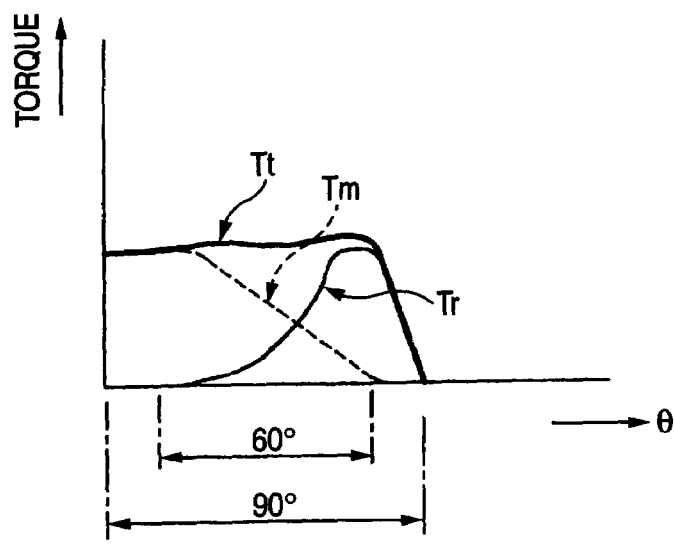
FIG. 12 is a graph showing a situation of torques generated by a brushless DC motor according to the first embodiment.

Successively, an explanation will be given of torque generated by the brushless DC motor of the embodiment in reference to a graph of FIG. 12. In the graph of FIG. 12, notation Tm designates the magnet torque, the notation Tr designates the reluctance torque and notation Tt designates a motor torque synthesized therewith, respectively. First, an investigation will be given of the magnetic torque Tm. According to the brushless DC motor of the embodiment, the magnet torque Tm is generated in a section substantially equal to the effective excitation opening angle θe. Because the effective magnetic pole opening angle θm and the effective excitation opening angle θe are set to be substantially equal to each other. Next, an investigation will be given of the reluctance torque Tr. The reluctance torque Tr constitutes a peak around a position at which the effective magnetic pole opening angle θm of the rotor 4 aligns with the effective excitation opening angle θe of the stator 1. That is, the reluctance torque Tr is provided with the peak at a phase advanced by 90° in electric angle and a phase lagged by 90° in electric angle relative to the magnetic torque Tm. The period is twice as much as the period of the magnetic torque Tm.

Thereby, according to the brushless DC motor of the embodiment, reluctance torque Tr is strongly generated at a region at which intensity of the magnetic torque Tm is reduced. Therefore, the motor torque Tt synthesized with the two torques, is substantially constant over a wide section as shown by the graph of FIG. 12. The graph of FIG. 12 shows a quarter period (electric angle of 90°).

Further, the brushless DC motor of the embodiment is provided with three-phase windings of U, V, and W as in FIG. 3, mentioned above. Therefore, when 120° electricity conduction is carried out, there are 6 ways of electricity conduction patterns of U→V, U→W, V→W, V→U, W→U, and W→V. Therefore, there may be provided a section in which the motor torque Tt is substantially constant, per respective electricity conduction pattern, which is equal to or larger than 60°. As is apparent from the graph of FIG. 12, this is sufficiently satisfied. Therefore, the brushless DC motor of the embodiment can be driven with extremely small pulsation of the torque. By taking a consideration also to timings of switching the electricity conduction patterns, the electricity conduction patterns may be switched at timings at which the torque variation in switching is extremely small.

Figure 13:
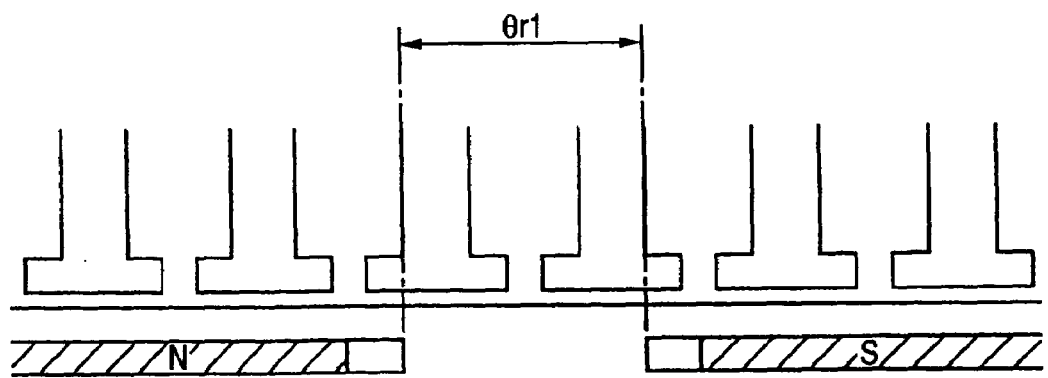
FIG. 13 is a view showing a relationship between magnetic poles of a rotor and teeth of a stator in a brushless DC motor according to a modified example by linear development.
Figure 14:
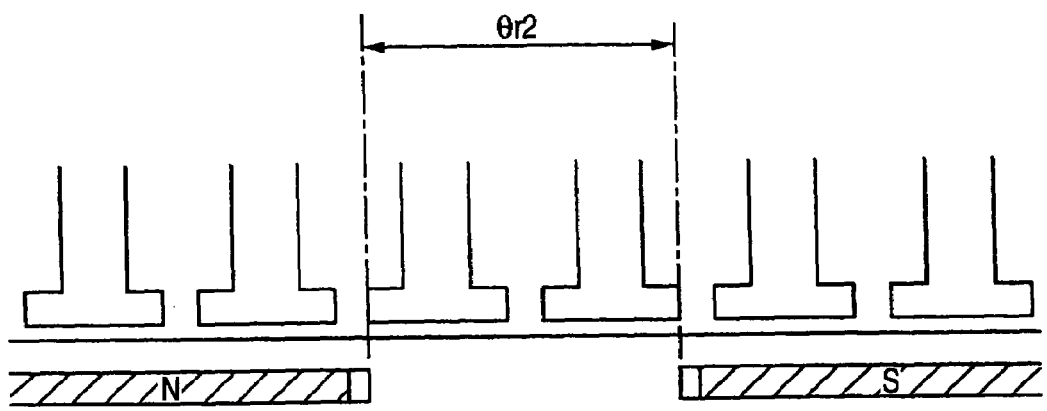
FIG. 14 is a view showing a relationship between magnetic poles of a rotor and teeth of a stator in a brushless DC motor according to a modified example by linear development.

According to the above-described explanation, unexcited teeth in the stator 1 are made to be present discretely piece by piece. Further, therefore, the bridge opening angle θr of the rotor 4 is set in conformity with the opening angle of one piece of the tooth 2 (θr1 of FIG. 2 or θr2 of FIG. 5). However, depending on ways of windings, it is possible to constitute also a motor in which a plurality of continuous teeth 2 in the stator 1 simultaneously become unexcited tees. The bridge opening angle θr of the rotor 4 in such a motor may be set as shown by FIG. 13 or FIG. 14. That is, the bridge opening angle θr is set to an opening angle for covering a total of a section in which unexcited teeth are continuous. FIG. 13 shows an example of setting the bridge opening angle θr to the opening angle θr1 which does not include the tip 3 on the both ends of the section. This corresponds to the example of FIG. 1 and FIG. 2. Meanwhile, FIG. 14 shows an example of setting the bridge opening angle θr to an opening angle θr2 including the tips 3 on both ends of the section. This corresponds to the example of FIG. 5.

The following is a general equation showing the bridge opening angle θr when a number of pieces of continuous unexcited teeth is not limited to 1.

$$(\theta tp \times n) + \theta th$$

Notation n is a number of the number of continuous unexcited teeth subtracted by 1 and is 0 or a natural number. Notation θtp in the equation designates the slot pitch angle of the stator 1 as mentioned in the explanation of FIG. 2. Notation θth designates the tooth opening angle. An opening angle which does not include the tip 3 is used as the tooth opening angle θth in the case of the example of FIG. 13. An opening angle including the tips 3 on the both sides is used as the tooth opening angle θth in the case of FIG. 14.

Figure 15:
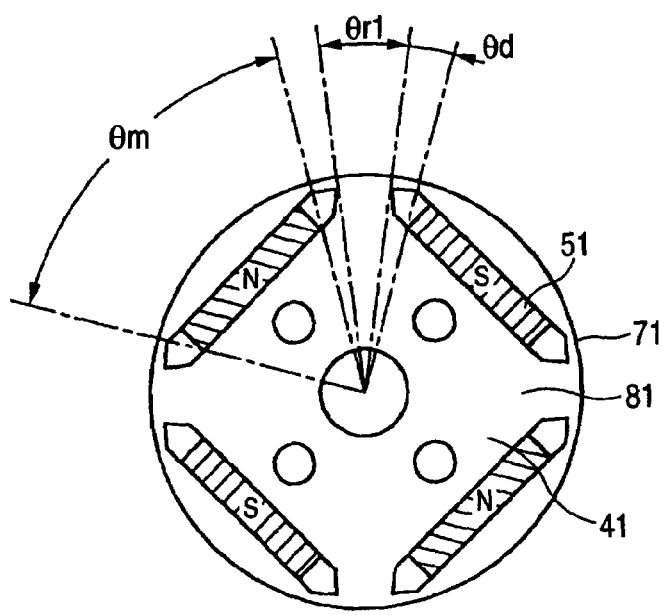
FIG. 15 is a view showing a structure of a rotor in a brushless DC motor according to a modified example.

According to the explanation up to here, any of the permanent magnet 5 is of a so-to-speak substantially circular arc type in which the permanent magnet 5 is provided along the outer periphery of the rotor 4. However, the invention is applicable also to a constitution of other than the substantially circular arc type. FIG. 15 shows such an example in which the invention is applied to a rotor 22 having a permanent magnet 24 in a flat plate shape. According to the rotor 22, a magnetic member on an outer side of the permanent magnet 24 is more or less thicker than those shown in FIG. 1 and the like. However, an effect similar to that in the case of the substantially circular arc type can be achieved by slenderly forming a rib 26 from an end portion of the permanent magnet 24 to a bridge 28 similar to the above-described.

As explained above in details, according to the brushless DC motor of the embodiment, the bridge opening angle θr of the rotor 4 is set in conformity with the opening angle of one piece or more of the teeth 2 in the stator 1 (θr1 in FIG. 2 or FIG. 13, θr2 in FIG. 5 or FIG. 14). Therefore, a large portion of the magnetic flux generated by exciting the stator coil (q axis in FIG. 8, contributing to reluctance torque) progresses to the inner side of the permanent magnet 5 by way of the bridge 8. Therefore, a magnet path thereof is directed from the permanent magnet 5 to an outer side and is separate from a magnet path of the magnetic flux interlinking with the stator coil (d axis in FIG. 8, contributing to magnetic torque).

Figure 18:
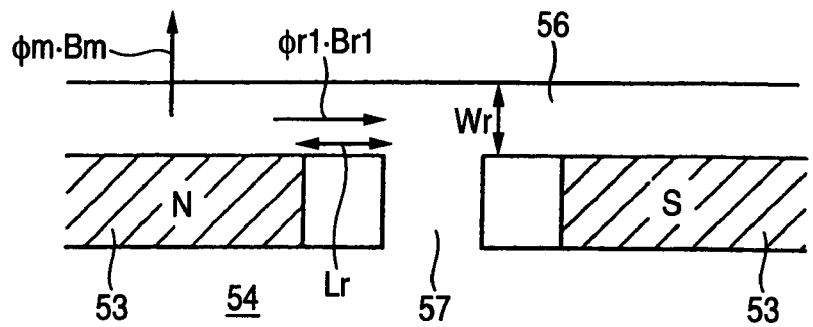
FIG. 18 is a linear development view showing a flow of a magnetic flux of a magnet of the rotor.

Therefore, the magnetic member of the rotor 4 is not magnetized excessively significantly by commonly providing the magnetic paths of the two magnetic fluxes. Therefore, the magnetic member of the rotor 4 does not fall into the magnetic saturation. Therefore, the torque in proportion to power applied to the stator coil is provided and the energy efficiency is excellent. Further, a waveform of the torque is a waveform which does not include almost any of harmonics components. Therefore, the properties of the motor are excellent and vibration or noise produced by the harmonics can be reduced by that amount. Further, the cogging torque is easily reduced independently with inconsiderably mutual influence of the magnet torque and the reluctance torque and therefore, a motor is easy to design. Specifically, the reduction of the cogging torque can be dealt with by pertinently setting the rib opening angle θd and the effective magnetic pole opening angle θm in the rotor 4. Further, the magnetic flux density distribution at the gap between the rotor 4 and the stator 1, is uniform in a range in correspondence with the permanent magnet 5. Therefore, the adverse influence explained by the bold line of the graph of FIG. 18 is eliminated.

Further, the brushless DC motor of the embodiment is further provided with the rib 7 along the outer periphery of the rotor 4 between the respective permanent magnet 5 and the respective bridge 8. Further, the rib 7 is made to be very slender. Therefore, the rib 7 is provided with high reluctance against the magnetic flux passing in the circumferential direction. Therefore, there is effectively restrained the leakage magnetic flux ($\phi r1$, $\phi s1$ in FIG. 9, $\phi r2$, $\phi s2$ in FIG. 10) in the magnetic flux of the permanent magnet 5 without interlinking with the stator coil via the gap ($\phi m1$, $\phi m2$ in FIG. 9, $\phi m3$, $\phi m4$ in FIG. 10). Therefore, the magnetomotive force of the permanent magnet 5 can effectively be utilized as the torque of the motor. Further, since the leakage magnetic flux is small, the variation of the leakage magnetic flux at the rotational position of the rotor 4 is also small. Thereby, the cogging torque produced by the variation of the leakage magnetic flux can also be reduced. Particularly, when the permanent magnet 5 is of strong rare earth species, the cogging torque produced by the variation of the leakage magnetic flux is liable to increase and therefore, significance of the effect is enormous.

Further, according to the brushless DC motor of the embodiment, the opening angle $\theta d$ of the rib 7 is set to fall in the range specified below relative to the teeth interval opening angle $\theta op$ of the stator 1.

$$0.5 \times \theta op \leq \theta d \leq \theta op$$

Therefore, the rib 7 is prevented from occupying an excessively large portion of the outer periphery of the rotor 4 while ensuring an effect of restraining the leakage magnetic flux. Therefore, the permanent magnet 5 or the bridge 8 is not improperly reduced and the function of the motor is not sacrificed.

Further, according to the brushless DC motor of the embodiment, the magnet torque and the reluctance torque are generated complimentarily (FIG. 12). Therefore, the variation of the synthesized torque can be reduced by a ratio of magnitudes of the two torques. Further, the rate per se of the reluctance torque occupied in the synthesized torque, can comparatively be made large. Therefore, a rate of dependency on the magnet torque can be restrained by that amount. Thereby, the amount of using the permanent magnet is restrained. The significance is particularly enormous when there is used a rare species magnet which is strong but expensive. As described above, according to the embodiment, there is realized the brushless DC motor utilizing the reluctance torque in which by separating the magnetic paths by the magnetic flux of the magnetic torque and the magnetic flux of the reluctance torque, the drawback by the mutual influence is excluded, the leakage of the magnetic flux of the permanent magnet is excluded as less as possible and the magnet torque is made full use.

Further, the embodiment is merely an exemplification and does not limit the invention at all. Therefore, the invention can naturally be improved or modified variously within the range not deviated from a gist thereof.

For example, the number of the magnetic poles of the rotor and the shape of the magnet, the number of teeth of the stator and the method of winding and the like are not limited to those exemplified above. Further, although according to the embodiment, there is shown the motor of the type in which the rotor is disposed at inside of the stator, the embodiment is applicable to a motor of a type in which a rotor is disposed on an outer side of a stator. In that case, the magnetic flux (q axis in FIG. 8) carrying burden of the reluctance torque generated by exciting the stator coil, comes out to the outer side of the permanent magnet by way of the bridge.

As is apparent from the above-described explanation, according to the invention, there is provided the brushless DC motor utilizing the reluctance torque in which the magnetic paths are separated by the magnetic flux of the magnetic torque and the magnetic flux of the reluctance torque and the drawback produced by the mutual influence is excluded. Further, there is provided the brushless DC motor utilizing the reluctance torque in which leakage of the magnetic flux of the permanent magnet is excluded as less as possible and the magnet torque is made full use. Further, the brushless DC motor utilizing the reluctance torque according to the invention achieves a significant advantage when used for a motor for driving an electric power steering apparatus of a vehicle.

Second Embodiment

A detailed explanation will be given of embodiments embodying a brushless DC motor according to the invention in reference to the attached drawings as follows. According to the embodiment, the invention is embodied as a brushless DC motor constituted by a stator of 12 slots and a rotor of 4 poles.

Figure 16:
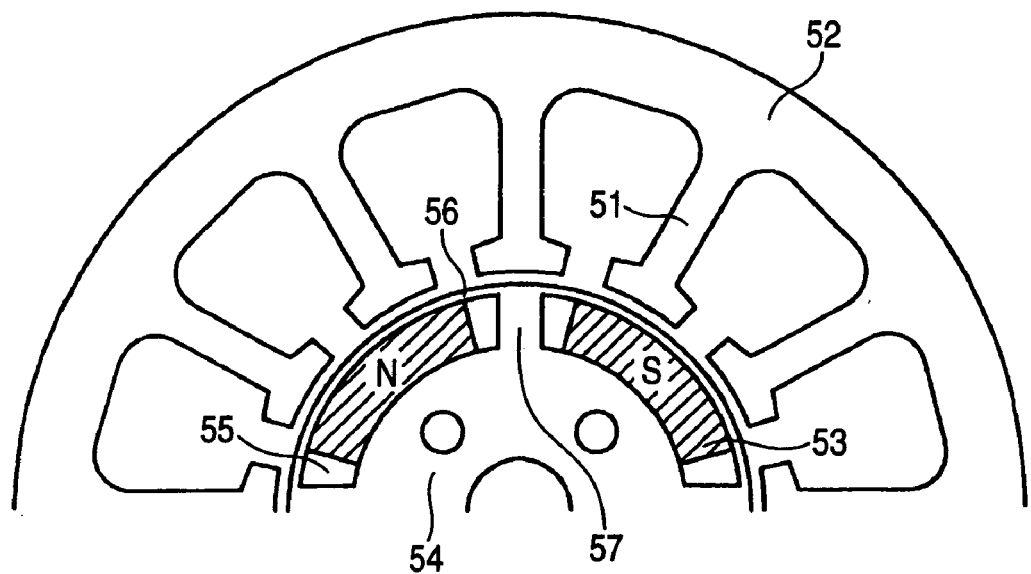
FIG. 16 is an outline constitution view of a brushless DC motor according to a second embodiment.

A brushless DC motor according to the embodiment is constituted by a structure as shown by FIG. 16. A stator 52 of the brushless DC motor includes 12 pieces of teeth 51 aligned at equal pitches in a circumferential direction. Meanwhile, a rotor 54 includes 4 pieces of magnets 53. The respective magnet 53 is formed by a shape of a so-to-speak substantially circular arc along an outer periphery of the rotor 54. A respective magnet attaching hole 55 at the rotor 54 is formed to be longer than the magnet 53 in the circumferential direction. The respective magnet 53 is attached to the center of the respective magnet attaching hole 55 in the circumferential direction. Therefore, there are gaps at both ends of the respective magnet 53. The respective magnet attaching hole 55 is formed to be extremely proximate to the outer periphery of the rotor 54. Therefore, a magnetic member on an outer side of the respective magnet attaching hole 55 is extremely slender. A portion of the magnetic member on the outer side of the respective magnet attaching holes 55 is referred to as a rib 56. There is present a bridge 57 for connecting a central portion of the rotor 54 and the rib 56 between the magnet attaching hole 55 and the magnet attaching hole 55. Further, in FIG. 16, a coil of the stator 52 is omitted.

Figure 17:
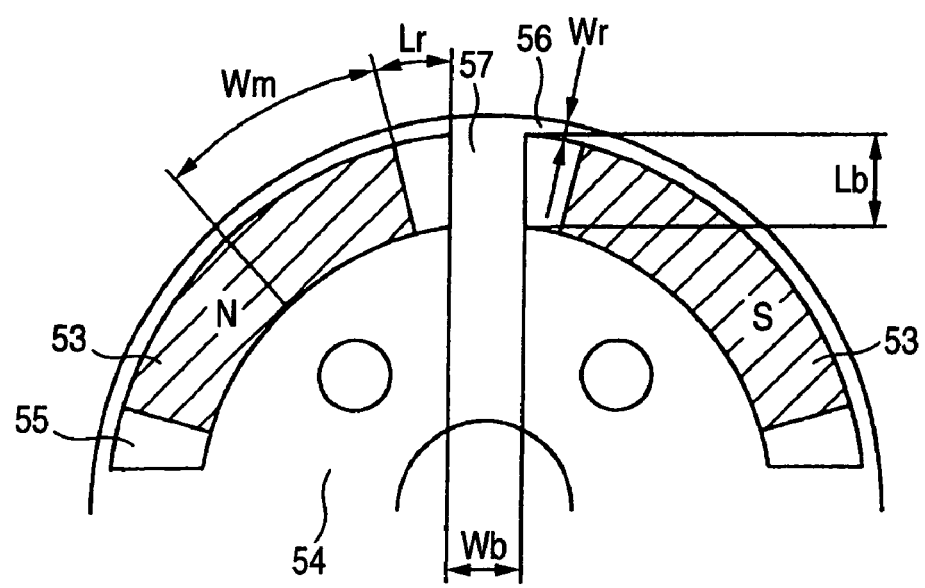
FIG. 17 is a view showing a rotor in FIG. 16.

An explanation will be given of names of dimensions of respective portions in the rotor 54 of the brushless DC motor according to the embodiment in reference to FIG. 17. First, a half of a width in the circumferential direction on an outer peripheral side of the magnet 53, is referred to as an effective magnetic pole width Wm. The effective magnetic pole width Wm is a distance of measuring from a center to an end in the circumferential direction on the outer peripheral side of the magnet 53 in a circular arc shape along the rib 56. Further, a length on an inner side of a portion of the rib 56 from one end of the magnet 53 to an end of the magnet attaching hole 55, is referred to as a rib length Lr. Further, a width in the circumferential direction of the bridge 57 is referred to as a bridge width Wb. The bridge width Wb is a shortest linear distance between the contiguous magnet attaching holes 55. Next, a length in a diameter direction of the bridge 57 is referred to as a bridge length Lb. The bridge length Lb is equal to a width in the diameter direction of the magnet attaching hole 55. Further, a width in the diameter direction of the rib 56 is referred to as a rib width Wr. When the width of the rib 56 is not constant, a width of a portion having a least width in a range on an outer side of the magnet 53, is defined as a rib width Wr.

According too the brushless DC motor of the embodiment, the rib width Wr is set to satisfy both of the following two equations. That is, the rib width Wr is set not to exceed a smaller value of a value given by the right hand side of Equation (1) and a value given by the right hand side of Equation (2).

$$\text{Equation 1} \quad Wr \leq \sqrt{\frac{R \times Wm}{Bz/Bm} \times Lr} \quad (1)$$

$$Wr \leq \frac{Q \times Wb}{Bz/Bb} \times \frac{(Lr + Wm)}{Lb} \quad (2)$$

where,
R: a rate of a leakage magnetic flux at the rib portion to a magnetic flux progressing from the magnet 53 to the stator 52
Q: a rate of a leakage magnetic flux at the rib portion to a magnetic flux passing from the stator tooth 51 to the bridge 57 of the rotor 54
Bz: a saturation magnetic flux density of the magnetic member of the rotor 54
Bm: a magnetic flux density of the rib 56 of the rotor 54 in the d axis direction (radial direction of the rotor)
Bb: a magnetic flux density of the bridge 57 of the rotor 54 in driving the rotor The reason of setting the rib width Wr in such a way, resides in the following point. That is, the rib width Wr significantly influences on the torque generated by the brushless DC motor. Because although the magnetic flux of the magnet 53 induces the magnet torque by interlinking with the stator 52, a portion of the magnetic flux unavoidably leaks at the rib 56. Therefore, the magnitude of the magnetic torque is controlled by large or small of the leakage magnetic flux at the rib 56. Further, large or small of the leakage magnetic flux is significantly controlled by the rib width Wr. The same goes with the reluctance torque. That is, although the excitation magnetic flux of the stator 52 induces the reluctance torque by passing the bridge 57 and interlinking with the axis core portion, a portion of the magnetic flux unavoidably leaks at the rib 56. Therefore, the magnitude of the reluctance torque is controlled by large or small of the leakage magnetic flux at the rib 56. Further, large or small of the leakage magnetic flux is significantly controlled by the rib width Wr.

A further explanation will be given of the magnetic flux from the magnet 53 in the above-described magnetic fluxes in reference to FIG. 18 and FIG. 19. As shown in FIG. 18 by subjecting a vicinity of the outer periphery of the rotor 54 to linear development, a large portion of the magnetic flux of the magnet 53 is interlinked with the stator 52 via the air gap. The magnetic flux φm relates to the magnet torque. A magnetic flux density in the diameter direction of the rib 56 by the magnetic flux φm is designated by notation Bm. Here, a portion of the magnetic flux of the magnet 53 passes the rib 56 and flows to the contiguous magnet 53 without interlinking with the stator 52. This does not relate to the magnetic torque and therefore is a leakage magnetic flux φr1. A remainder produced by subtracting the leakage magnetic flux φr1 from the total magnetic flux of the magnet 53 is the magnetic flux φm. A magnetic flux density in the circumferential direction of the rib 56 by the leakage magnetic flux φr1, is designated by notation Br1. Further, in FIG. 18 (also similar to FIG. 20 mentioned below), the rib width Wr is drawn to be bolder than actual.

Figure 19:
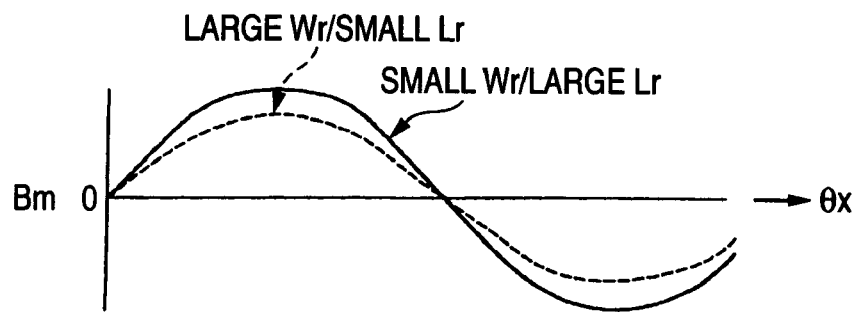
FIG. 19 is a graph showing a magnetic flux density of a magnetic flux related to a magnet torque.

The magnetic flux density Bm is controlled by the rib width Wr as shown by a graph of FIG. 19. Because the leakage magnetic flux φr1 is controlled by the rib width Wr. That is, as shown by a curve of a broken line, when the rib width Wr is large, the magnetic flux density Bm is small. Therefore, the magnet torque is not increased. Because when the rib width Wr is large, reluctance or the rib 56 in the circumferential direction is small and the leakage magnetic flux φr1 is increased by that amount. In contrast thereto, as shown by a curve of a bold line, when the rib width Wr is small, the magnetic flux density Bm is large. Therefore, large magnet torque is achieved. Because when the rib width Wr is small, the reluctance in the circumferential direction of the rib 56 is large and the leakage magnetic flux φr1 is reduced by that amount. Further, a similar effect is achieved when the rib length Lr is large, similar to that when the rib width Wr is small. Further, a similar effect is achieved when the rib length Lr is small similar to that when the rib width Wr is large. Further, the abscissa x in FIG. 19 designates a phase angle in the rotor 54.

Figure 20:
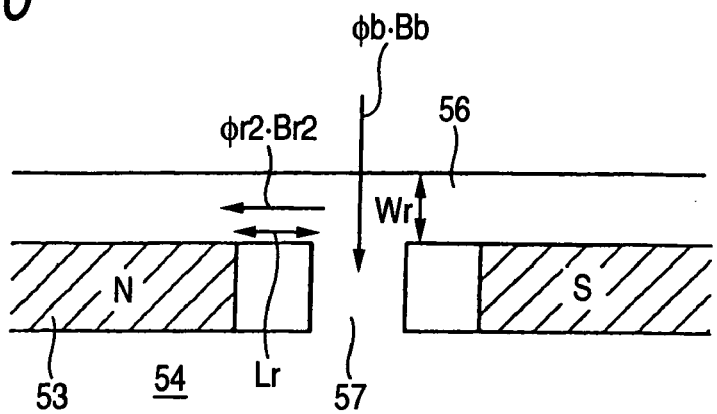
FIG. 20 is a linear development view showing a flow of a magnetic flux interlinking with the rotor from a stator.

Next, a further explanation will be given of the magnetic flux interlinking with the rotor 54 from the stator 52 in reference to FIG. 20. As shown in FIG. 20 by subjecting the vicinity of the outer periphery of the rotor 54 to the linear development, a large portion of the magnetic flux interlinking with the rotor 54 from the stator 52 via the air gap, flows to the axis core portion by passing the bridge 57. The magnetic flux φb relates to the reluctance torque. A magnetic flux density in the diameter direction of the bridge 57 by the magnetic flux φb is designated by notation Bb. Here, a portion of the magnetic flux progressing from the stator 52 to the rotor 54, passes the rib 56 and returns to the stator 52 without interlinking with the bridge 57. This does not relate to the reluctance torque and therefore is a leakage magnetic flux φr2. A remainder produced by subtracting the leakage magnetic flux φr2 from the total magnetic flux progressing from the stator 52 to the rotor 54, is designated by a magnetic flux φb. A magnetic flux density in the circumferential direction of the rib 56 by the leakage magnetic flux φr2 is designated by notation Br2.

Also the magnetic flux density Bb is controlled by the rib width Wr and the rib length Lr similar to the above-described magnetic flux density Bm. Because the leakage magnetic flux φr2 is controlled by the rib width Wr and the rib length Lr. That is, the magnetic flux density Bb is small when the rib width Wr is large (the rib length Lr is small). Therefore, the reluctance torque is not increased. In contrast thereto, the magnetic flux density Bb is large when the rib width Wr is small (the rive length Lr is large). Therefore, the large reluctance torque is achieved.

Next, an investigation will be given of the motor torque constituting a total of the magnetic torque and the reluctance torque. Consider here an equivalent two-phase machine produced by converting inductance of three-phase windings provided to the stator from fixed coordinates to rotation coordinates. Then, the motor torque Tt is generally represented by the following equation.

$$Tt = P \times \sqrt{\frac{3}{2}} \times \Phi m_{MAX} \times Iq + P \times (Ld - Lq) \times Id \times Iq \quad \text{Equation 2}$$

P: pole pair number $\phi m_{MAX}$: a maximum value of $\phi m$

Id (d axis current): excitation current of a coil of the tooth 51 opposed to a center of the magnetic pole (center in the circumferential direction of the magnet 53) of the rotor 54

Iq (q axis current): excitation current of a coil of the tooth 51 opposed to between the magnetic poles (that is, the bridge 57) of the rotor 54

Ld: inductance of the coil of the tooth 51 opposed to the center of the magnetic pole of the rotor 54

Lq: inductance of the coil of the tooth 51 opposed to between the magnetic poles of the rotor 54

In Equation 2, the first term corresponds to the magnet torque and the second term corresponds to the reluctance torque. It is known thereby that the reluctance torque is proportional to a magnitude of a difference between Ld and Lq. Further, in Equation 2, even when (Ld−Lq) is negative, in the case in which Id is negative and Iq is positive, signs of the first term and the second term coincide with each other. Therefore, the two torques are increased together. Here, inductance of the coil of the stator is proportional to a change over time of an amount of the magnetic flux interlinking with the coil. Therefore, when the leakage magnetic flux is reduced, the amount of the magnetic flux interlinking with the coil is relatively increased and reluctance torque increased.

Figure 21:
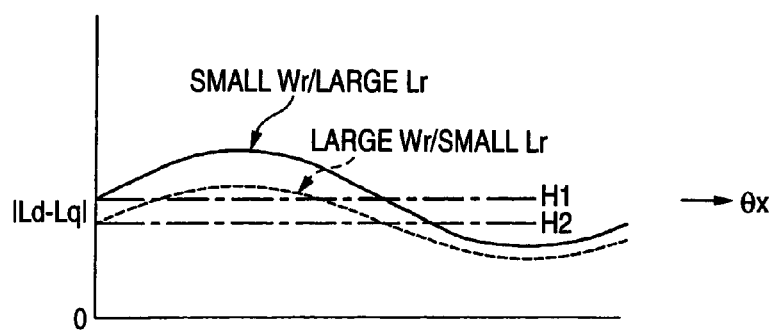
FIG. 21 is a graph showing a difference between inductance Lq and inductance Ld.

The magnitude of the difference between Ld and Lq is shown by a graph of FIG. 21 by the rib width Wr (or the rib length Lr) and a rotational angle $\phi x$ of the rotor 54. FIG. 21 shows the ordinate by an absolute value as a diagram representing the magnitude of the inductance. It is known from the graph that |Ld−Lq| is controlled by the rib width Wr. That is, as shown by a curve of a broken line, when the rib width Wr is large, |Ld−Lq| is small. Therefore, the reluctance torque is not increased. In contrast thereto, as shown by a curve of a bold line, when the rib width Wr is small, |Ld−Lq| is large. Therefore, the large reluctance torque is achieved. Further, an effect is achieved when the rib length Lr is large similar to that when the rib width Wr is small. Further, an effect is achieved when the rib length Lr is small similar to that when the rib width Wr is large. Further, notation H1 in the graph of FIG. 21 designates an average value of |Ld−Lq| when the rib width Wr is small. Notation H2 designates an average value of |Ld−Lq| when the rib width Wr is large.

The above-described is synthesized as follows. That is, in a state in which the reluctance of the rotor 54 is low in view from the arbitrary tooth 51 of the stator 52, the interlinking magnetic flux from the tooth 51 of the rotor 54 is naturally increased. However, when the leakage magnetic flux $\phi r2$ is large, regardless of the rotational angle of the rotor 54, the interlinking magnetic flux from the tooth 51 to the rotor 54 is not so much changed. This signifies that the torque of the rotor 54 which is going to move to a position at which the interlinking magnetic flux from the tooth 51 to the rotor 54 is the largest, that is, the reluctance torque is small. Therefore, large or small of the leakage magnetic flux $\phi r2$ influences on the magnitude of the reluctance torque.

An explanation will successively be given of a condition to be satisfied by the rib width Wr. The rib width Wr may be small to a degree by which the rib 56 reaches or exceeds the saturation magnetic flux density by the leakage magnetic fluxes $\phi r1$ and $\phi r2$. Because when the rib width Wr is small as described above, the reluctance in the circumferential direction of the rib 56 is very large and the leakage magnetic fluxes $\phi r1$ and $\phi r2$ are restrained. Further, because the magnitudes of the leakage magnetic fluxes $\phi r1$ and $\phi r2$ are not so much changed under any situation.

First, an investigation will be given of a condition based on the magnetic flux of the magnet 53. The magnetic flux density Bm in the radial direction (d axis direction) of the rib 56 is represented by the following equation by using the magnetic flux $\phi m$ interlinking with the stator 52 from the magnet 53 via the air gap and related to the magnet torque, the effective magnetic pole width Wm and a thickness (laminated thickness) Lh of the rotor 54.

$$Bm = \frac{\phi m}{Wm \times Lh} \quad \text{Equation 3}$$

Further, the magnetic flux density Br1 in the circumferential direction of the rib 56 is represented by the following equation by using the leakage magnetic flux $\phi r1$ by the rib 56 in the magnetic flux of the magnet 53, the rib width Wr and the thickness (laminated thickness) Lh.

$$Br1 = \frac{\phi r1}{Wr \times Lh} \quad \text{Equation 4}$$

Here, a rate ($\phi r1/\phi m$) of the leakage magnetic flux $\phi r1$ to the magnetic flux $\phi m$ related to the magnet torque is represented by notation R. When the above-specified R is used Equation 4 is represented as follows.

$$Br1 = \frac{R \times \phi m}{Wr \times Lh} \quad \text{Equation 5}$$

Meanwhile, a condition by which the rib 56 reaches to be equal to or larger than the saturation magnetic flux density Bz by the leakage magnetic flux $\phi r1$, is represented by the following equation by using a ratio Bz/Bm of the magnetic flux density Bm in the d axis direction to the saturation magnetic flux density Bz.

$$Br1 \geq \frac{Bz}{Bm} \times Bm \quad \text{Equation 6}$$

The following equation is provided by substituting Equation 3 and Equation 5 therefor.

$$\frac{R \times \phi m}{Wr \times Lh} \geq \frac{Bz}{Bm} \times \frac{\phi m}{Wm \times Lh} \quad \text{Equation 7}$$

The following equation is provided by solving the above-described inequality with regard to the rib width Wr.

$$Wr \leq \frac{R \times Wm}{Bz/Bm} \qquad \text{Equation 8}$$

Consider here of the reluctance of the rib 56. The reluctance of the rib 56 to the leakage magnetic flux φr1 is proportional to the rib length Lr and inversely proportional to the rib width Wr. By taking the fact into consideration, Equation 8 finally becomes the following equation.

$$Wr \leq \frac{R \times Wm}{Bz/Bm} \times \frac{Lr}{Wr} \qquad \text{Equation 9}$$

Therefore, finally, by multiplying both sides of Equation 9 by Wr and taking a root, Equation (1) of Equation 1, mentioned above, is provided. Therefore, the rib width Wr must be equal to or lower than a value given by the right hand side of Equation (1) of Equation 1.

Next, an investigation will be given of a condition based on the magnetic flux interlinking with the rotor 54 from the stator 52. The magnetic flux density Bb in the diameter direction (q axis direction) of the bridge 57 is represented by the following equation by using the magnetic flux φb interlinking with the axis core portion of the rotor 54 from the stator 52, the bridge width Wb and the laminated thickness Lh of the rotor 54.

$$Bb = \frac{\phi b}{Wb \times Lh} \qquad \text{Equation 10}$$

Further, the magnetic flux density Br2 in the circumferential direction of the rib 56 is represented by the following equation by using the leakage magnetic flux φr2 by the rib 56 in the magnetic flux of the stator 52, the rib width Wr and the laminated thickness Lh.

$$Br2 = \frac{\phi r2}{Wr \times Lh} \qquad \text{Equation 11}$$

Here, a rate (φr2/φb) of the leakage magnetic flux φr2 to the magnetic flux φb related to the reluctance torque, is represented by notation Q. When the above-specified Q is used, Equation 11 is represented as follows.

$$Br2 = \frac{Q \times \phi b}{Wr \times Lh} \qquad \text{Equation 12}$$

Meanwhile, a condition by which the rib 56 reaches to be equal to or larger than the saturation magnetic flux density Bz by the leakage magnetic flux φr2, is represented by the following equation by using the magnetic flux density Bb in the q axis direction and a ratio Bz/Bb of the magnetic flux density Bb in the q axis direction to the saturation magnetic flux density Bz.

$$Br2 \geq \frac{Bz}{Bb} \times Bb \qquad \text{Equation 13}$$

The following equation is provided by substituting Equation 10 and Equation 12 therefor.

$$\frac{Q \times \phi b}{Wr \times Lh} \geq \frac{Bz}{Bb} \times \frac{\phi b}{Wb \times Lh} \qquad \text{Equation 114}$$

The following equation is provided by solving the above-described inequality with regard to the rib width Wr.

$$Wr \leq \frac{Q \times Wb}{Bz/Bb} \qquad \text{Equation 15}$$

Consider here of the reluctance of the rib 56. The leakage magnetic flux φr2 passes not only a portion of the rib 56 between the magnet 53 and the bridge 57 (length Lr) but also a portion thereof in contact with the magnet 53 (length Wm). Therefore, the magnetic reluctance of the rib 56 to the leakage magnetic flux φr2 is proportional to a sum of the rib length and effective magnetic pole width (Lr+Wm) and inversely proportional to the rib width (Wr). By taking the fact into consideration, finally, Equation (2) of Equation 1, mentioned above, is provided. Therefore, the rib width Wr must be equal to or smaller than the value given by the right hand side of Equation (2) of Equation 1, mentioned above.

From the above-described, when a consideration is given to both of the magnetic flux of the magnetic torque and the magnetic flux of the reluctance torque, the rib width Wr must be equal to or smaller than a smaller value of the value given by the right hand side of Equation (1) of Equation 1 and the value given by the right hand side of Equation (2) of Equation 1. Therefore, according to the brushless DC motor of the embodiment, the rib width Wr is set as described above. Therefore, according to the brushless DC motor of the embodiment, the leakage magnetic fluxes φr1 and φr2 per se are very small and there is almost no variation thereof. Further, notations "R" and "Q" used in the Equations are parameters which can be set in designing the motor.

Figure 22:
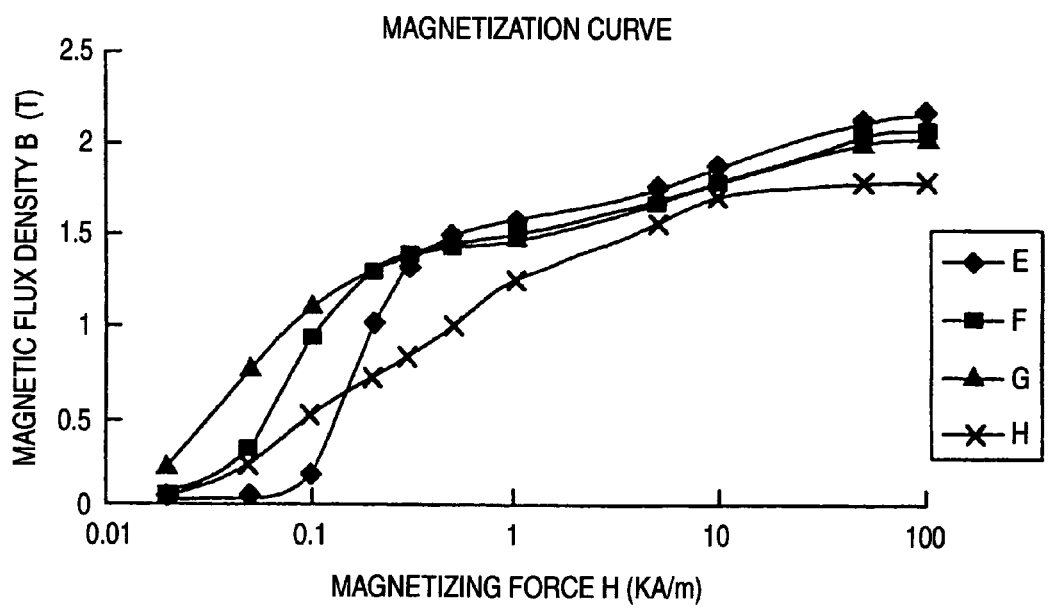
FIG. 22 is a graph showing a magnetization curve of a representative magnetic member.

An explanation will be given here of Bz/Bm and Bz/Bb in the respective equations of Equation 1. For that purpose, an explanation will firstly given of a magnetizing property of a silicon steel plate constituting a representative magnetic member used in an iron core of a motor of this kind. An explanation will be given here of four kinds of samples of sample E: 50A10000 (JIS), sample F: 50A400 (JIS), sample G: 35A230 (JIS) and sample H: 6.5% Si silicon steel plate. As shown by a graph of a magnetization curve of FIG. 22, a saturation magnetic flux density Bz in a general region of using the silicon steel plates, falls in a range of 1.8 through 2.2 tesla.

Further, when the magnetic flux density Bm in the d axis direction and the magnetic flux density Bb in the q axis direction, mentioned above, are excessively proximate to the saturation magnetic flux density Bz, it signifies that the energy loss is large. Because the magnetic flux densities Bm and Bb are not so much increased with regard to the magnetizing force. Therefore, the magnetic flux densities Bm and Bb are to be set not to be proximate to the saturation magnetic flux density Bz regardless of a situation of rotating the brushless DC motor. For that purpose, set values of the magnetic flux densities Bm and Bb are to be set to be equal to or smaller than 1 tesla. Meanwhile, when the set values of the magnetic flux densities Bm and Bb are excessively small, the function of the motor is not achieved sufficiently. Therefore, the set values of the magnetic flux densities Bm and Bb are made to fall in a range of 0.5 through 1.0 tesla. Thereby, ranges to be taken by Bz/Bm and Bz/Bb become 1.8 through 4.4.

Figure 23:
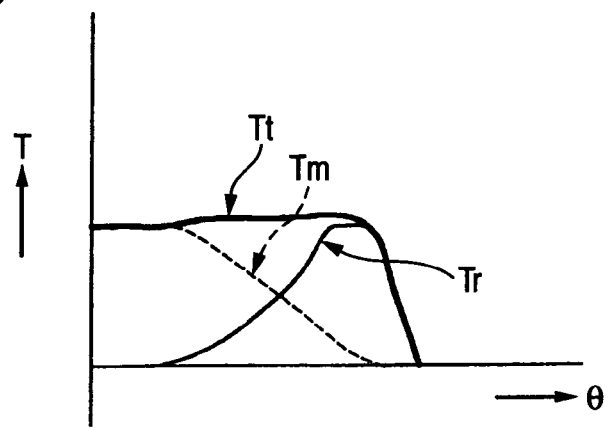
FIG. 23 is a graph showing a torque of the brushless DC motor according to the second embodiment.

According to the brushless DC motor of the embodiment, the waveform of the torque is as shown by FIG. 23. The graph is for a case in which the effective excitation pole opening angle is set to be substantially equal to the excitation magnetic pole pitch, showing a quarter period of the electric angle. The magnet torque Tm is generated substantially in a section equal to the effective excitation magnetic pole opening angle. The reluctance torque Tr is generated around a position at which the magnet 53 of the rotor 54 is aligned to the effective excitation tooth 51 of the stator 52. Therefore, the reluctance torque Tr is provided with a period twice as much as that of the magnet torque Tm in a state of advancing the phase by 90° in the electric angle. Therefore, the magnet torque Tm and the reluctance torque Tr compensate for each other.

Further, since the rib width Wr of the rotor 54 is set as described above, both of the magnet torque Tm and the reluctance torque Tr are hardly varied by influence of the leakage magnetic fluxes φr1 and φr2. Therefore, when peak values of the two torques are the same, the synthesized motor torque Tt is substantially constant. Further, when a three-phase motor of 120° electricity conduction is considered, the motor torque Tt may be provided with an effective section of 60° with regard to 6 of the electricity conduction patterns. Therefore, when electricity conduction is switched at a timing at which the motor torque Tt is constant, the motor torque of the three-phase motor become extremely smooth having almost no pulsation.

Figure 24:
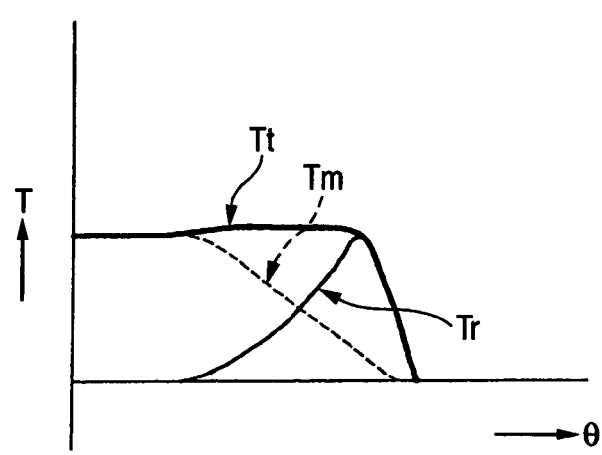
FIG. 24 is a graph showing a torque of a brushless DC motor in which a magnetic torque is dominant.
Figure 25:
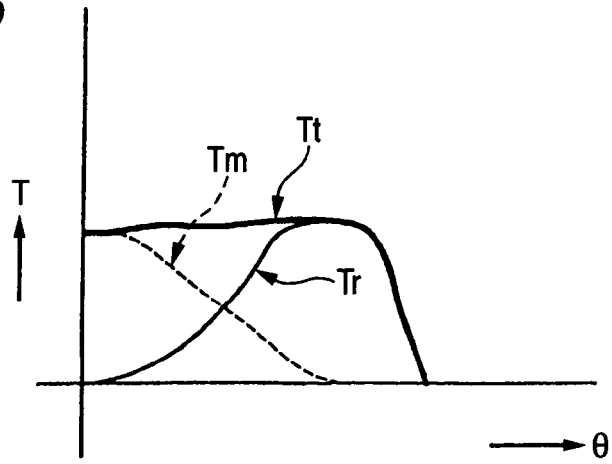
FIG. 25 is a graph showing a torque of a brushless DC motor in which a reluctance torque is dominant.

Further, the magnet torque Tm is dominant with regard to the motor torque Tt depending on the brushless DC motor (refer to FIG. 24). In the case of such a brushless DC motor, only Equation (1) of Equation 1 may be considered. The rib width Wr in that case, may be equal to or smaller than the value given by the right hand side of Equation (1) of Equation 1. Or, the reluctance torque Tr may be dominant with regard to the motor torque Tt depending on the brushless DC motor (refer to FIG. 25). In the case of such a brushless DC motor, only Equation (2) of Equation 1 may be considered. That is, the rib width Wr in that case may be equal to or smaller than the value given by the right hand side of Equation (2) of Equation 1. Here, the magnet torque Tm or the reluctance torque Tr is dominant as specified below. That is, in graphs of FIG. 23 through FIG. 25, when an integrated intensity of the magnet torque Tm is larger than an integrated intensity of the reluctance torque Tr, the magnet torque Tm is dominant. In the inverse case, the reluctant torque Tr is dominant.

Figure 26:
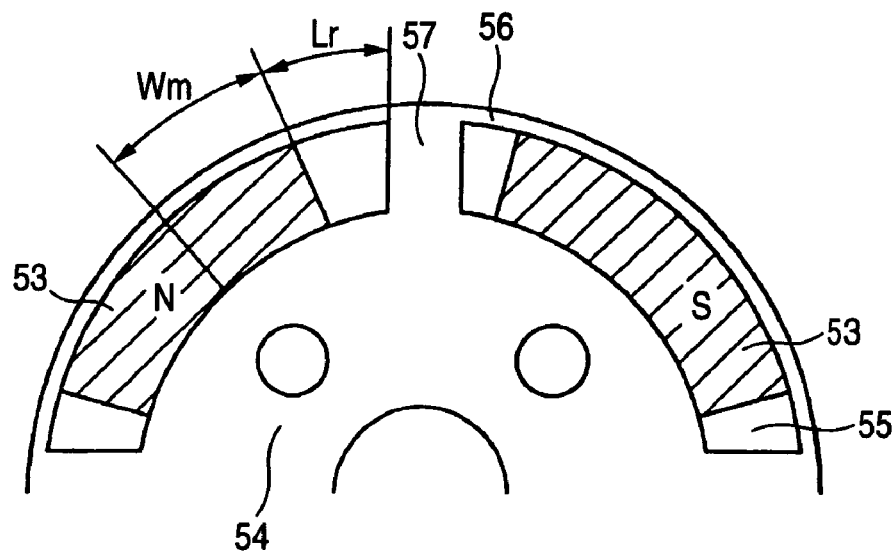
FIG. 26 is a view showing a rotor in which a magnet is attached to deviate.

Further, depending on the brushless DC motor, there is a case in which the magnet 53 of the rotor 54 is attached not to the center in the circumferential direction of the magnet attaching hole 55 but attached to be deviated therefrom. The effective magnetic pole width Wm with regard to such a magnetic pole may be defined as follows. Strictly thinking, the definition depends on with which of two of contiguous magnets d axis the magnetic flux from the magnet 53 is interlinked. That is, the effective magnetic pole width Wm is to be defined from a boundary of a magnetic flux interlinking with the right contiguous magnet and magnetic flux interlinking with the left contiguous magnet to an end portion thereof. However, as shown by FIG. 26, in the case of the magnet 53 deviated to the left side in the drawing, much of the interlinking magnetic flux is going to flow to the left contiguous one constituting low reluctance in view of a magnetic path. However, magnets of contiguous magnetic poles are arranged to be opposed to each other relatively and therefore, when a pair of the magnetic poles are constituted, a magnetic flux amount remains almost unchanged. Therefore, the boundary of the effective magnetic pole width Wm of the magnetic pole may be determined by the center in the circumferential direction of the magnet attaching hole 55.

Figure 27:
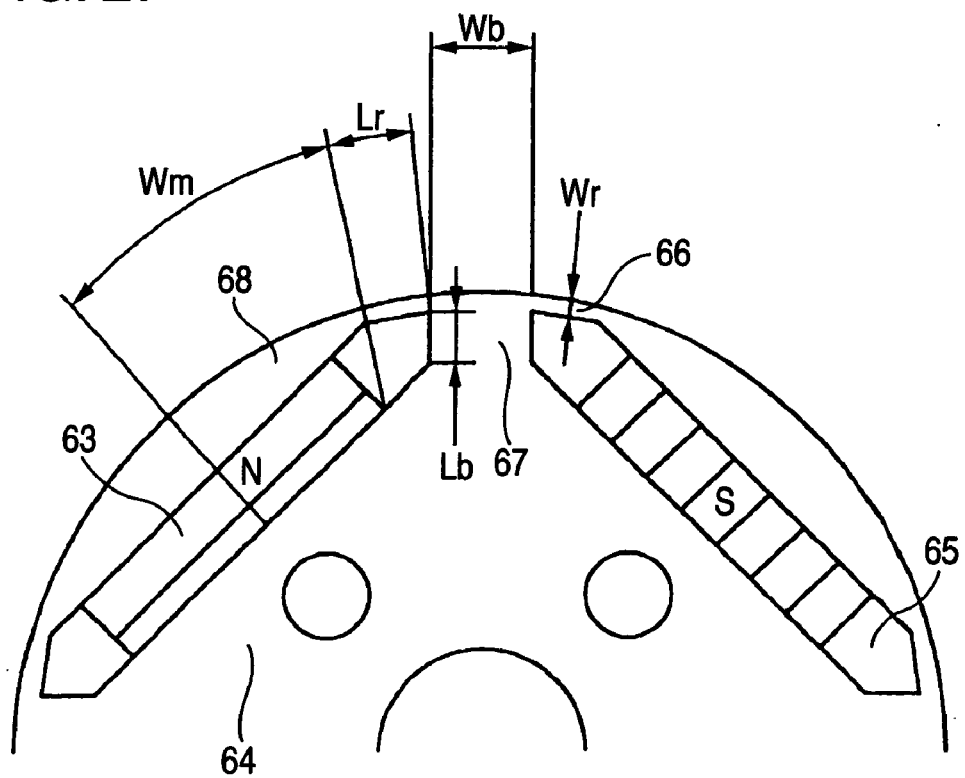
FIG. 27 is a view showing a rotor having a magnet in a linear shape.

Next, an explanation will be given of a case of a brushless DC motor having the magnet 63 in a linear shape as shown by FIG. 27. Also in the case of the rotor 64 in such a shape, the bridge width Wb and the bridge length Lb may be considered similar to the above-described. With regard to the rib length Lr and the rib width Wr, a rib 66 is defined by a portion of a magnetic member of a magnet attaching hole 65 having a least width. It is necessary to replace the effective magnetic pole width Wm not by a value from a center to an end of the magnet 63 per se but a value in consideration of reluctance. Specifically, Wm in Equation (1) of Equation 1, is defined as a length from the center of the magnet 63 to a boundary thereof with the rib 66. Because the magnetic flux (d axis) of the magnet 63 is widened in the circumferential direction at a magnetic member region 68 on an outer side of the magnet 63 and progresses to the stator. Wm in Equation (2) of Equation 1 is defined as a length realizing reluctance the same as reluctance in the circumferential direction of the magnetic member region 68 by a width the same as the rib width Wr. This is considerably short and when a width in a diameter direction of the magnetic member region 68 is considerably wider than the rib width Wr, the length may be disregarded and the equation may be considered to have only the rib length Lr.

As explained above in details, according to the brushless DC motor of the embodiment, the width Wr of the rib 56 on an outer peripheral side of the magnet 53 is defined to be equal to or smaller than the value given by the right hand side of Equation (1) of Equation 1. Further, the width Wr is defined to be equal to or smaller than the value given by the right hand side of Equation (2) of Equation 1. Therefore, the rib 56 reaches the saturation magnetic flux density Bz easily by the leakage component φr1 in the magnetic flux of the magnet 53 or also by the leakage component φr2 in the magnetic flux interlinking with the rotor 54 from the stator 52. Therefore, the leakage magnetic flux is hardly varied under any rotational situation. Therefore, the magnet torque and the reluctance torque are not influenced by the variation of the leakage magnetic flux. In this way, there is realized the brushless DC motor which hardly brings about pulsation of a torque produced by the variation of the leakage magnetic flux in the synthesized motor torque. Therefore, the two torques can be utilized with excellent balance.

The fact is significant in the case of the brushless DC motor using a strong magnet of rare earth species or the like. In such a motor, a width of a variation in the leakage magnetic flux φr1 is liable to increase by an amount of the large magnetomotive force of the magnet. By constituting the motor as in the embodiment, even in the case of using such a magnet, influence by the variation in the leakage magnetic flux φr1 can be minimized.

According to the brushless DC motor of the embodiment, Bz/Bm and Bz/Bb are set in a range of 1.8 through 4.4.

Therefore, the magnetic flux density Bm in the d axis direction and the magnetic flux density Bb in the q axis direction do not approach considerably to the saturation magnetic flux density Bz. Therefore, there is realized a structure of the brushless DC motor having a small amount of the energy loss produced by the magnetic saturation of the magnetic member of the rotor 54.

Further, according to the brushless DC motor of the embodiment, the magnetic path (d axis) of the magnet torque and the magnetic path (q axis) of the reluctance torque are separated from each other at the vicinity of the air gap. Because of the fact and also owing to the small amount of the leakage magnetic flux, mentioned above, the two torques are less reduced. Further, separation of the paths of the two magnetic fluxes, also restrains harmonics of the magnet torque. Because deflection of the magnetic flux of the magnet torque caused by the magnetic flux of the reluctance torque is inconsiderable. Thereby, generation of sound and vibration is also prevented.

Further, the embodiment is only a simple exemplification and does not limit the invention at all. Therefore, the invention can naturally be improved or modified variously within the range not deviated from gist thereof. For example, the number of the magnet poles of the rotor, the shape of the magnet, the number of the teeth of the stator and the like are not limited to those exemplified. Further, although according to the embodiment, there is shown the motor of the type in which the rotor is disposed at inside of the stator, the embodiment is applicable to a motor of a style in which a rotor is disposed on an outer side of a stator. In that case, a magnetic flux generated by exciting a stator coil and carrying burden of a reluctance torque, come out to an outer side of a magnet via a bridge.

As is apparent from the above-described explanation, according to the invention, there is provided the brushless DC motor having the structure in which in the brushless DC motor utilizing both of the magnetic torque and the reluctance torque, adverse influence by the leakage magnetic flux is made as small as possible and the two torques are effectively utilized with excellent balance. Further, the energy caused by the magnetic saturation is also reduced. Further, the brushless DC motor utilizing the reluctance torque according to the invention, achieves a significant advantage when used in a motor for driving an electric power steering apparatus of a vehicle.

Third Embodiment

A detailed explanation will be given of embodiments embodying the invention in reference to the attached drawings as follows.

Figure 28:
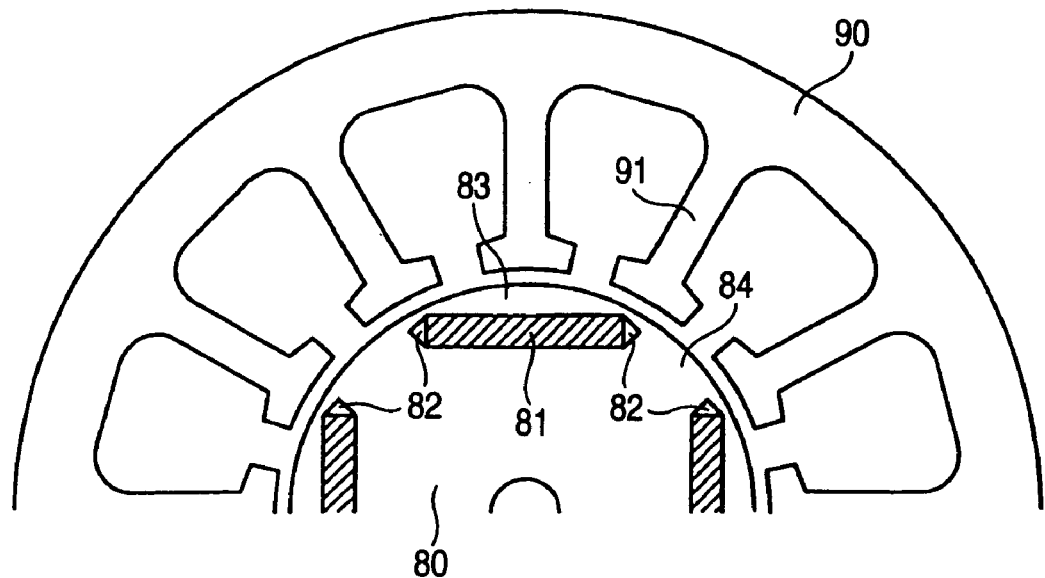
FIG. 28 is a view showing a structure of a brushless DC motor according to a third embodiment.

A brushless DC motor according to the embodiment is constituted as shown by FIG. 28. FIG. 28 is shown by omitting a lower half of the motor. A rotor 80 of FIG. 28 is provided with 4 pieces of magnets 81 and a pole pair number is 2. Therefore, an electric angle with regard to the rotor 80 is twice as much as a geometrical angle. The rotor 80 is formed with 4 of magnet attaching holes 82. The respective is attached with a single one of the magnet 81. There is present a magnetic member region 83 also on an outer side of the respective magnet 81 in the rotor 80. Further, there is present a bridge 84 connecting an outer side and an inner side of the magnet 81 by a magnetic member between the contiguous magnets 81. A stator 90 of FIG. 28 includes 12 pieces of teeth 91. Although windings are provided actually to the respective teeth 91, the windings are omitted in FIG. 28.

Figure 29:
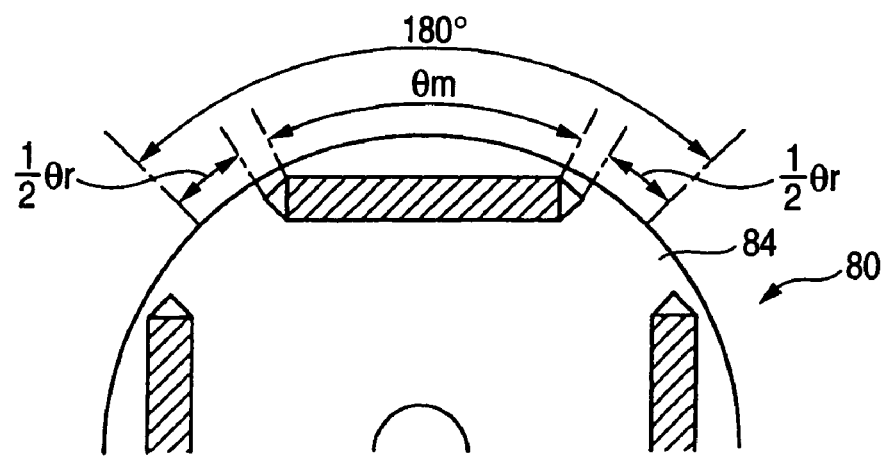
FIG. 29 is a view for explaining angles of respective portions of a rotor in FIG. 28.

A further explanation will be given of the rotor 80 in FIG. 28 in reference to FIG. 29. FIG. 29 is shown by taking out the rotor 80 in FIG. 28. According to the rotor 80, an angle from a middle to a contiguous middle of the magnets 81, is 180° in electric angle. Further, an angle of a portion thereof occupied by the magnet 81, is referred to as effective magnetic pole opening angle θm. Both ends of the effective magnetic pole opening angle θm are intersections with radii passing both ends of the magnet 81 on an outer peripheral side thereof. Further, an angle from an end of the magnet attaching hole 82 to a middle of the magnet 81, corresponds to a half of a bridge opening angle θr. It is apparent that a sum of the angles on both sides is equal to the opening angle of the bridge 84. A gap between the effective magnetic pole opening angle θm and each of the portions of (½)θr on the both sides, corresponds to a gap at a vicinity of the end portion of the magnet attaching hole 82. Although the gap is drawn exaggeratingly in FIG. 29, the gap is actually smaller from reason, mentioned later. That is, a large portion (equal to or larger than 83.3%, more preferably, equal to or larger than 90%) of a supplementary angle of the effective magnetic pole opening angle θm is occupied by a bridge opening angle θr.

Figure 30:
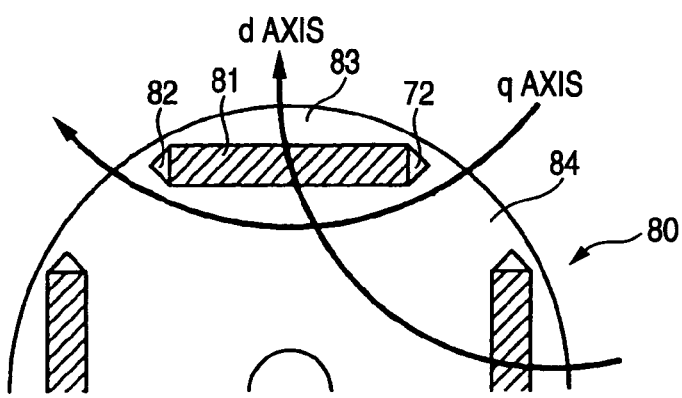
FIG. 30 is a view showing a situation of interlinking magnetic fluxes in the rotor in FIG. 28.

An explanation will be given of a situation of interlinking magnetic fluxes in the rotor 80 in reference to FIG. 30. First, an explanation will be given of the magnetic flux related to the magnet torque. The magnetic flux related to the magnet torque is interlinked as shown by an arrow mark of d axis in FIG. 30. That is, the magnetic flux passes 2 of the magnets 81 and the magnetic member regions 83 on outer sides thereof and does not pass the bridge 84. Meanwhile, the magnetic flux related to the reluctance torque is interlinked as shown by an arrow mark of q axis in FIG. 30. That is, the magnetic flux passes the bridges 84 at 2 locations and does not pass the magnet 81 and the magnetic member region 83 on the outer side. Thereby, the magnetic member region 83 on the outer side is a path of the magnetic flux mainly related to the magnet torque. Meanwhile, the bridge 84 is a path of the magnetic flux mainly related to the reluctance torque. Therefore, in order to utilize the reluctance torque as effectively as possible, it is necessary that reluctance in a radius direction of the bridge 84 is as small as possible. A large portion of the supplementary angle of the effective magnetic pole opening angle θm is occupied by the bridge opening angle θr for such a reason.

A synthesized torque Tt of this kind of the motor is generally represented by the following equation.

$$Tt = P \times \sqrt{\frac{3}{2}} \times \Phi m_{MAX} \times Iq + P \times (Ld - Lq) \times Id \times Iq \qquad \text{Equation 16}$$

P: a pole pair number
$\Phi m_{MAX}$: a maximum value of the magnetic flux related to the magnet torque
Iq: current exciting the q axis direction of the rotor 80
Id: current exciting the d axis direction of the rotor 80
Lq: inductance of windings of the tooth 91 opposed to the q axis direction of the rotor 80
Ld: inductance of windings of the tooth 91 opposed to the d axis direction of the rotor 80

The first term of the right hand side of the equation corresponds to the magnet torque in proportion to a magnetic flux amount of the magnet 81. The second term corresponds to the reluctance torque in proportion to a difference of inductances between the d axis and the q axis. A sum of the magnet torque and the reluctance torque is the synthesized torque Tt.

Figure 31:
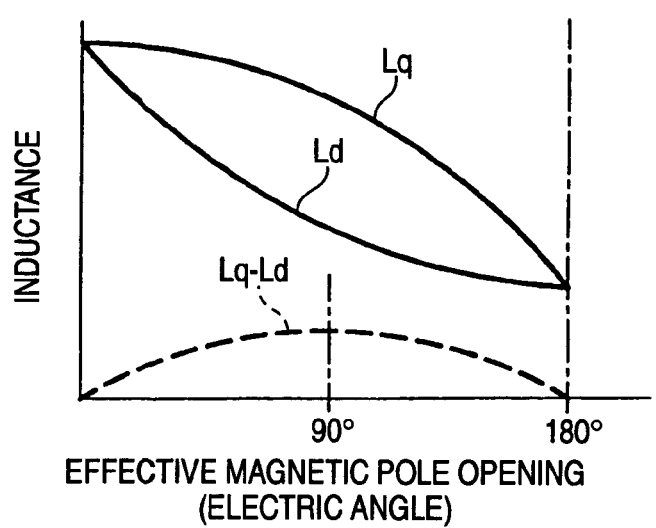
FIG. 31 is a graph showing inductance when an effective magnetic pole opening angle is changed in the rotor in FIG. 28.

Consider here a situation of the torque when the effective magnetic pole opening angle θm of the magnet 81 is changed and the bridge opening angle θr is also changed in accordance therewith. When the inventors carry out a simulation, a result shown in a graph of FIG. 31 is provided with regard to the inductances Lq and Ld. According to the graph, the abscissa designates the effective magnetic pole opening angle θm and the ordinate designates inductance. Further, three ways of curves of Lq, Ld, and Lq–Ld are drawn in the graph.

In taking a look at a case in which the effective magnetic pole opening angle θm is 180° (electric angle) in the graph, there is not a difference between Lq and Ld and therefore, Lq–Ld becomes null. Therefore, the reluctance torque is not generated. There is not a differentiation between the d axis and q axis in a magnetic flux path in this case and all of the magnetic fluxes detour the magnet 11. Because Lq and Ld coincide with each other at a low value thereby. Further, that the effective magnetic pole opening angle θm is 180° in electric angle, is that there is not present the bridge 84 and there is not present a magnetic flux path for the reluctance torque.

Conversely, in taking a look at a case in which the effective magnetic pole opening angle θm is 0°, there is not still a difference between the Lq and Ld and therefore, Lq–Ld becomes null. Therefore, the reluctance torque is not generated. In this case, there is not the magnet 81, all of the magnetic fluxes pass the magnetic member and therefore, there is not still a differentiation between the d axis and the q axis. Therefore, Lq and Ld coincide with each other at a high value.

When the behavior is analyzed with respect to a magnetic field and a magnetic flux distribution in the air gap is calculated, there is known a situation of a case in which the effective magnetic pole angle θm falls in a range of 0° through 180° in electric angle. When the inductances Lq and Ld are calculated in this way, it is known that Lq–Ld becomes a maximum when the effective magnetic pole opening angle θm is 90° (electric angle). The curve of Lq–Ld in the graph of FIG. 31 shows the fact.

When the torque is calculated by applying the result to Equation 16, mentioned above, a graph as shown by FIG. 32 is provided. The reluctance torque Tr in the graph is provided with a shape the same as that of the curve of Lq–Ld in FIG. 31. Naturally, the larger the number of the magnet 81, the stronger the magnet torque Tm and therefore, there is constituted a curve rising to the right in the graph. The synthesized torque Tt is the total of the reluctance torque Tr and the magnet torque Tm.

In taking a look at a location at which the effective magnetic pole opening angle θm is 180° (electric angle) in the graph, all of the synthesized torque Tt depends on the magnetic torque Tm and there is not the reluctance torque Tr. Conversely in taking a look at a location at which the effective magnetic pole opening angle θm is 0°, the magnetic torque Tm is null. Because the magnet 81 is not present. Further, the reluctance torque Tr is also null from the above-described reason. Therefore, the synthesized torque Tt is null.

Hence, consider that the effective magnetic pole opening angle θm is reduced from 180° (electric angle) little by little. In this case, the magnetic torque Tm is going to be reduced with a reduction in the effective magnetic pole opening angle θm. Because the magnetic flux amount of the magnet 81 is going to be reduced. However, the reluctance torque Tr is conversely increasing. Further, an increase in the reluctance torque Tr is more than a reduction in the magnet torque Tm. Therefore, the synthesized torque Tt is increasing by the reduction in the effective magnetic pole opening angle θm. Such a situation is continued until the effective magnetic pole opening angle θm reaches 150° (electric angle). When the effective magnetic pole opening angle θm becomes smaller than 150° (electric angle), the reduction in the magnet torque Tm becomes conversely more than the increase in the reluctance torque Tr. Therefore, the synthesized torque Tt constitutes a maximum value at a location at which the effective magnetic pole opening angle θm is 150° (electric angle) and tends to reduce thereafter. Further, at a location at which the effective magnetic pole opening angle θm is 120° (electric angle), there is constituted the synthesized torque Tt the same as that when the effective magnetic pole opening angle θm is 180° (electric angle). The synthesized torque Tt thereafter becomes a value lower than that when the effective magnetic pole opening angle θm is 180° (electric angle).

As described above, there is present a region for providing the synthesized torque Tt stronger than that when the effective magnetic pole opening angle θm is 180° (electric angle) in a range in which the effective magnetic pole opening angle θm is smaller than 180° (electric angle) and larger than 120° (electric angle). The nearer the effective magnetic pole opening angle θm to 150° (electric angle), the more significant is the tendency of increasing the torque. A significant difference in comparison with the conventional motor actually, falls in a range of the effective magnetic pole opening angle θm from 127° (electric angle) to 173° (electric angle) Naturally, the narrower than range, the more advantageous. By setting the effective magnetic pole opening angle θm in such a range, in comparison with the brushless DC motor having the effective magnetic pole opening angle θm of 180° (electric angle), there is provided the synthesized torque Tt which is rather strong by a less amount of using the magnet 81.

Figure 33:
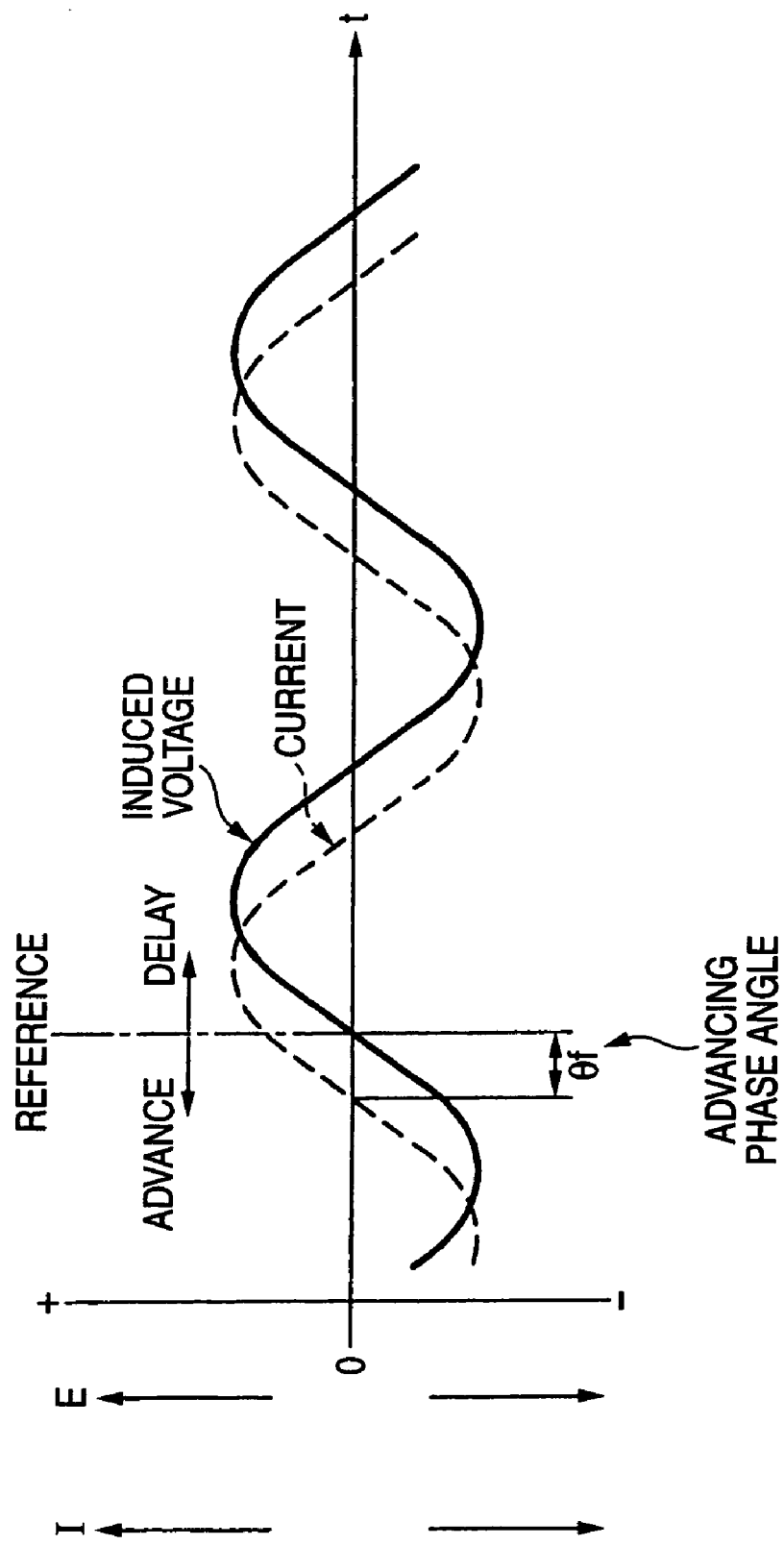
FIG. 33 is a waveform diagram showing an advancing phase of excitation current relative to induced voltage.

Hence, in order to actually generate the above-described synthesized torque in the brushless DC motor of the embodiment in which the effective magnetic pole opening angle θm is made to be smaller than 180° (electric angle), the motor must be driven to generate the reluctance torque. For such a purpose, a phase of excitation current applied to the windings of the stator 90 must be a phase more advanced than a phase of so-to-speak induced voltage of the motor as shown by FIG. 33. This is apparent because the d axis current Id is put to the second term of the right hand side of Equation 16, mentioned above.

Hence, an explanation will be given of an advancing phase of the excitation current. With regard to excitation from the stator 90, the magnet flux is easy to pass in the q axis direction of the rotor 80 (refer to FIG. 30) and the inductance Lq is large. Because the magnetic member is present continuously in the radius direction. In contrast thereto, the magnetic flux is difficult to pass in the d axis direction of the rotor 80 and the inductance Ld is small. Therefore, (Ld–Lq) of the second term of the right hand side of Equation 16 is negative. In order to achieve the strong synthesized torque Tt, the second term (reluctance torque) needs to be positive. For that purpose, when the q axis current Iq is positive, the d axis current Id must be negative and conversely, when the q axis current Iq is negative, the d axis current Id must be positive.

Figure 34:
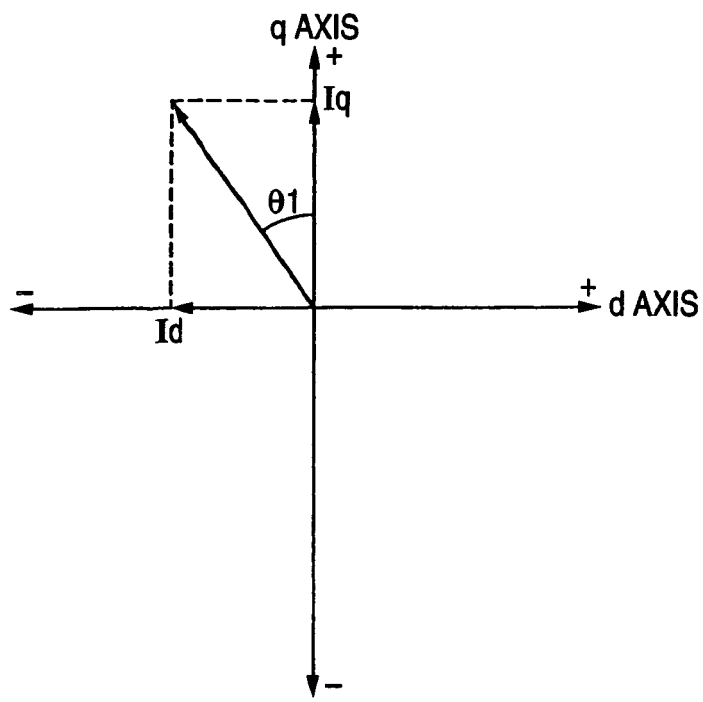
FIG. 34 is a vector diagram showing the advancing phase of the excitation current.
Figure 35:
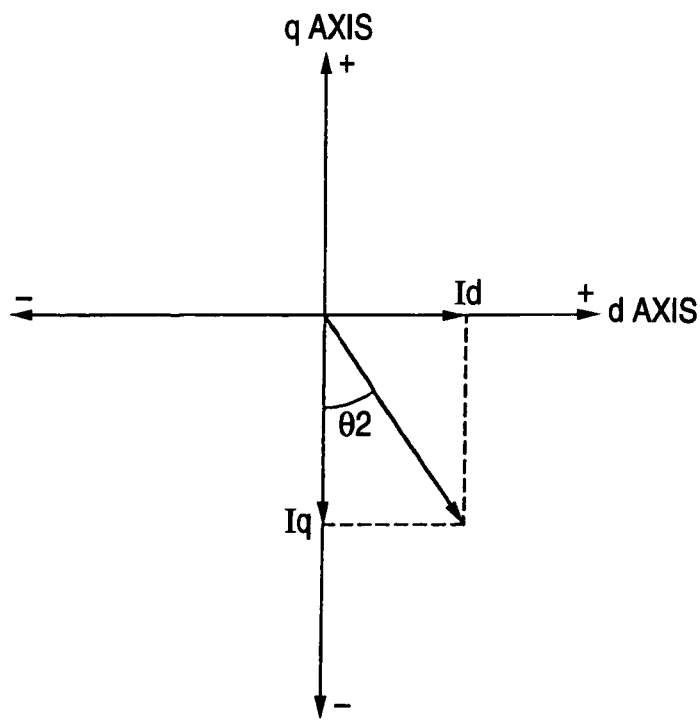
FIG. 35 is a vector diagram showing the advancing phase of the excitation current.

FIG. 34 and FIG. 35 represent the fact as vector diagrams with the d axis as a reference. FIG. 34 shows a case in which the d axis current Id is negative. FIG. 35 shows a case in which the d axis current Id is positive. It is known from the vector diagrams that there is needed current having a phase angle of θ1 (FIG. 34) or θ2 (FIG. 35) relative to the q axis current Iq. This is the advancing phase of the excitation current. That is, as an advancing phase angle θf in the waveform diagram of FIG. 33, mentioned above, θ1 of FIG. 34 or θ2 of FIG. 35 may be used.

Figure 32:
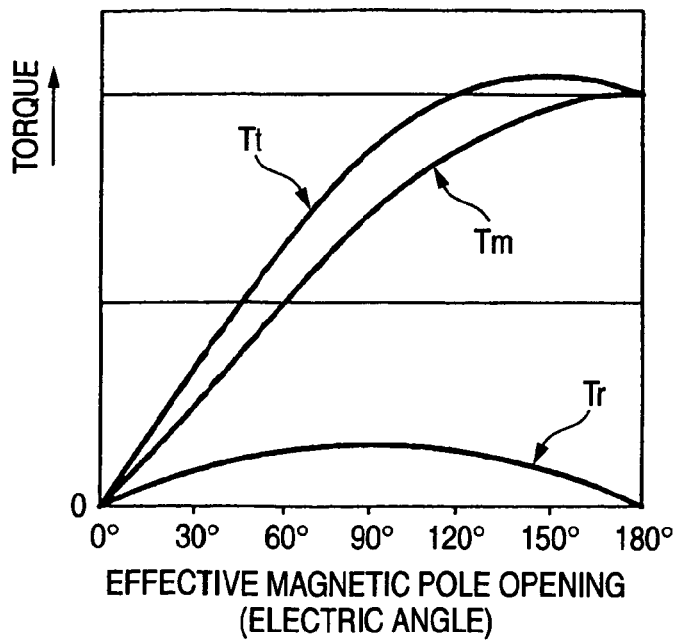
FIG. 32 is a graph showing a torque when the effective magnetic pole opening angle is changed in the brushless DC motor of FIG. 28.
Figure 36:
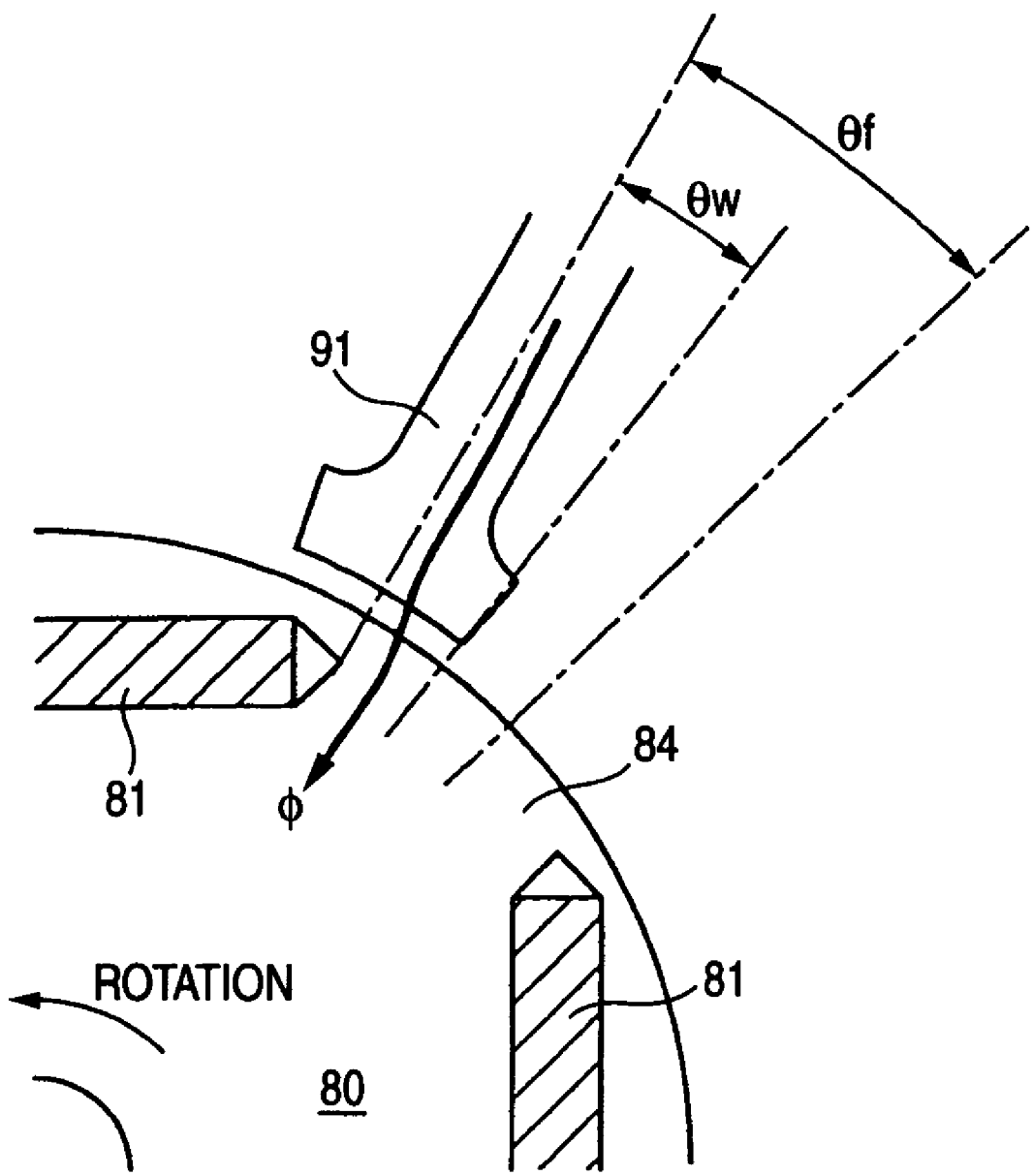
FIG. 36 is a view for explaining a situation of interlinking a magnetic flux by the excitation current having the advancing phase with a bridge of a rotor.

A further explanation will be given of the advancing phase angle in comparison with the structure of the brushless DC motor. As shown by FIG. 36, application of the excitation current having the advancing phase angle signifies that excitation of the tooth 91 is started earlier than when the bridge 84 of the rotor 80 is opposed to a front face of the tooth 91 of the stator 90 (advancing angle θf) as shown by FIG. 36. At this occasion, the tooth 91 and the bridge 84 are angularly overlapped (angle θw) or extremely proximate to each other and therefore, the excitation magnetic flux Φ of the tooth 91 is interlinked easily with the bridge 84. Because the bridge 84 occupies the large portion of the supplementary angle of the effective magnetic pole opening angle θm. Therefore, the bridge 84 is attracted toward the tooth 91 and the reluctance torque predicted in reference to FIG. 32 is generated.

Figure 37A:
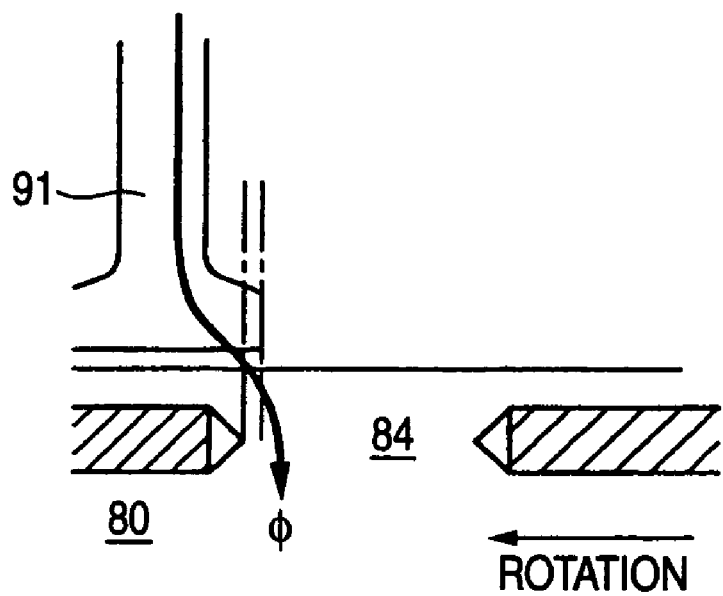
FIG. 37 illustrates views showing a relationship between a situation of aligning a bridge and a tooth and a reluctance torque.
Figure 37B:
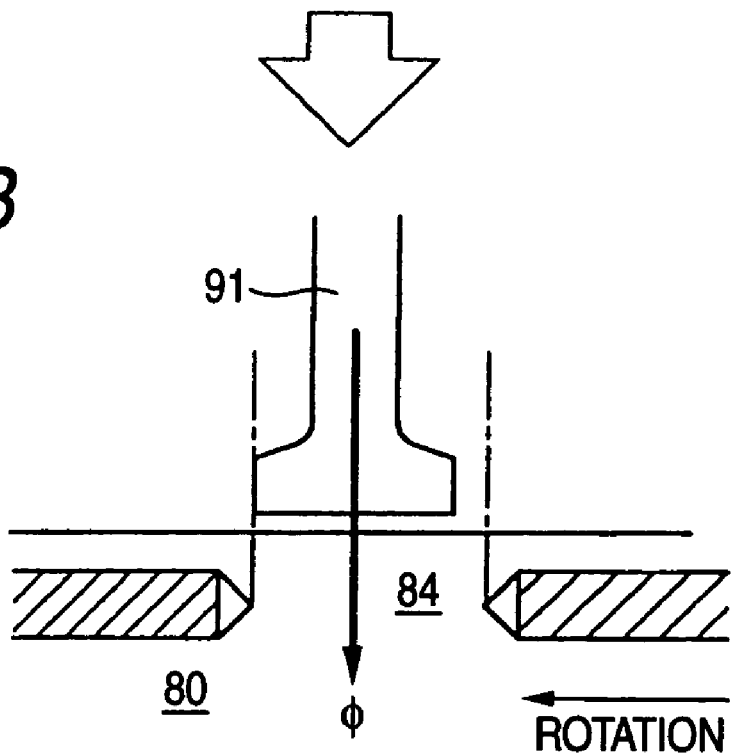
Figure 38:
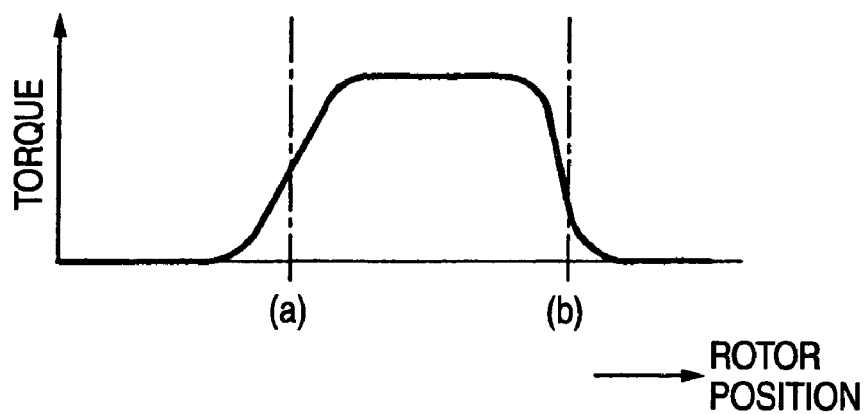
FIG. 38 is a graph showing the relationship between the situation of aligning the bridge and the tooth and the reluctance torque.

Further, a situation of generating the reluctance torque by efficiently interlinking the excitation magnetic flux of the tooth 91 with the bridge 84 as described above, is continued from a timing shown in FIG. 37A to a timing shown in FIG. 37B. FIG. 37A shows a state immediately after starting to align the bridge 84 to the tooth 91. FIG. 37B shows a state in which one of the bridge 84 and the tooth 91 is incorporated in other range by rotating the rotor 80 from the state of FIG. 37A. As shown by FIG. 38, the reluctance torque is generated between the timings and is substantially constant therebetween. Further, since the reluctance torque is generated by such timings, the magnet torque and the reluctance torque are connected without gap in view of a vertical row.

Figure 39:
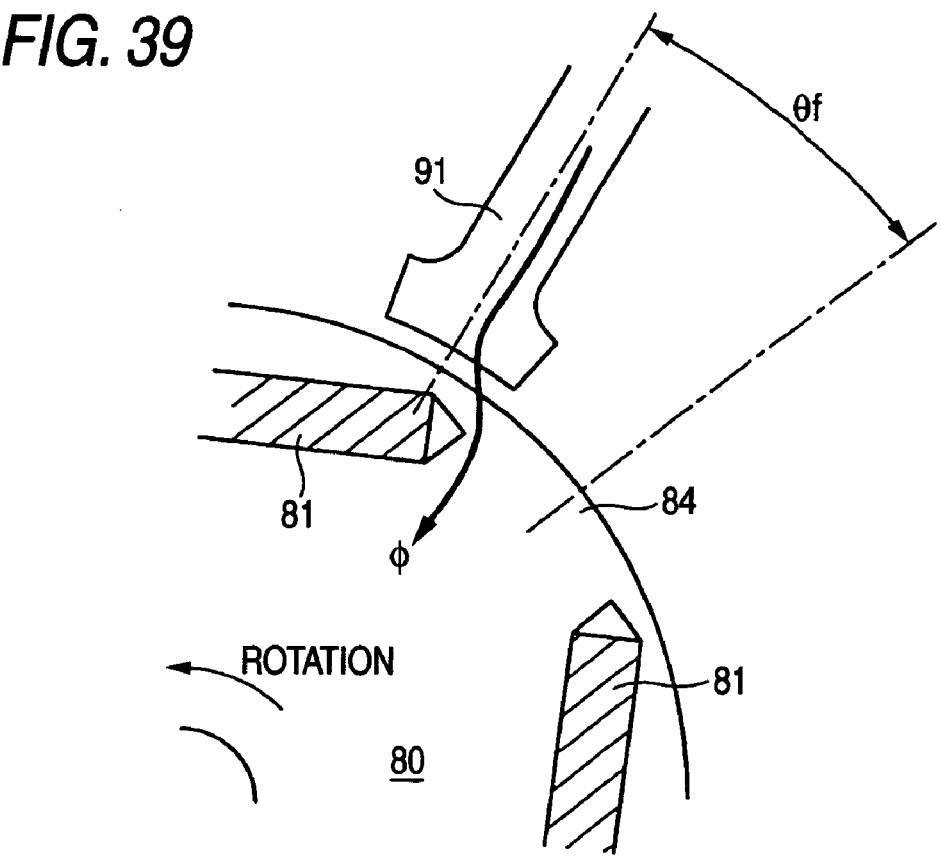
FIG. 39 is a view for explaining a situation of interlinking the magnetic flux by the excitation current having the advancing phase with the bridge of the rotor.
Figure 40:
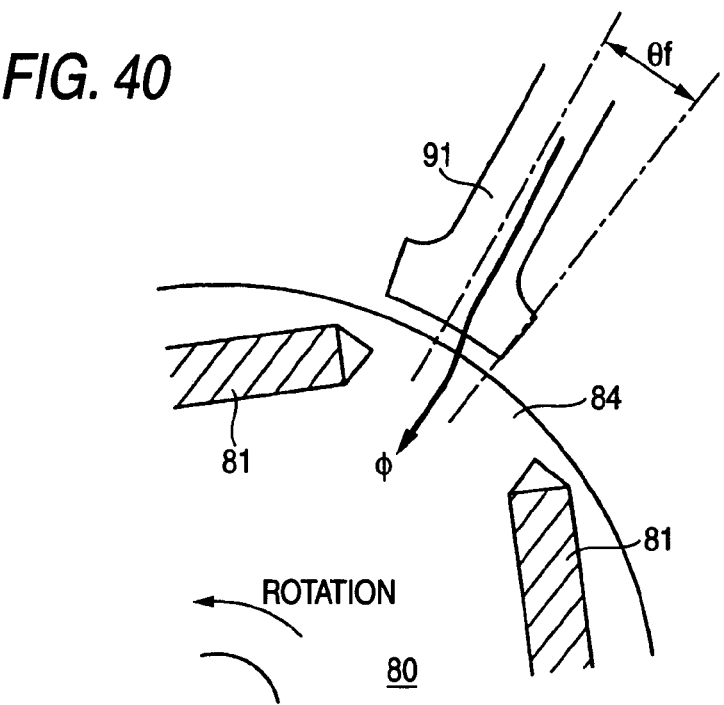
FIG. 40 is a view for explaining a situation of interlinking the magnetic flux by the excitation current having the advancing phase with the bridge of the rotor.
Figure 41:
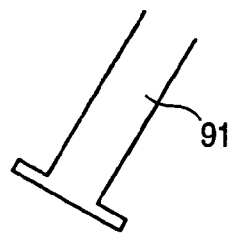
FIG. 41 is a view showing a shape of a front end of a tooth of a stator.

It is known from FIG. 36 that an optimum value of the advancing phase angle θf is a half of the bridge opening angle θr in electric angle. However, since the tooth 91 is provided with an opening angle to some degree, a substantially the same effect is achieved even when the advancing phase angle θf is shifted within the range. FIG. 39 shows a situation of increasing the phase angle θf at maximum in the range. FIG. 40 conversely shows a situation in which the advancing phase angle θf is minimized in the range. Therefore, a range of a value to be taken by the advancing phase angle θf is a range constituting a center by ½ of the bridge opening angle θr in electric angle and constituting a width thereof by an opening angle in electric angle of a width of the tooth at an excitation center of the reluctance torque. When excitation of the reluctance torque is carried out with respect to the single tooth 91, the width is an opening angle in electric angle of the tooth 91. When a plurality of the continuous teeth 91 are excited for the reluctance torque, the width is an opening angle in electric angle of a width occupied by the plurality of teeth 21 and openings thereamong. Further, in the case of a shape of the tooth in which the magnetic flux is widened at portions of tips at a front end thereof as shown by FIG. 36 and the like, the opening angle of the tooth 91 is constituted by an opening angle including also the portions of the tips. However, in the case of a shape of the tooth in which the magnetic flux is difficult to widen at portions of tips at a front end thereof as shown by FIG. 41, the width is constituted by an opening angle which does not include the portions of the tips. When excitation is carried out over a plurality of the teeth having such a tip shape, the width is constituted by an opening angle excluding tips at both ends on the outermost sides.

Figure 42:
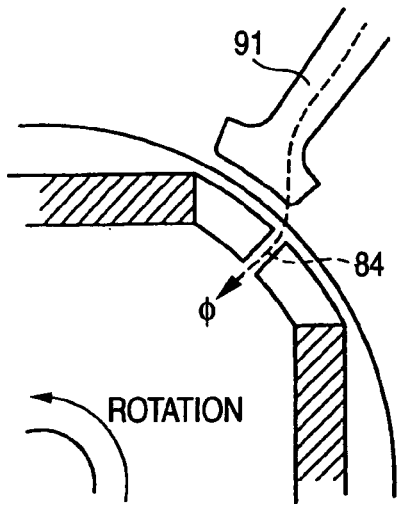
FIG. 42 is a view showing a situation in corresponding with a situation of FIG. 36 in a conventional brushless DC motor.
Figure 47:
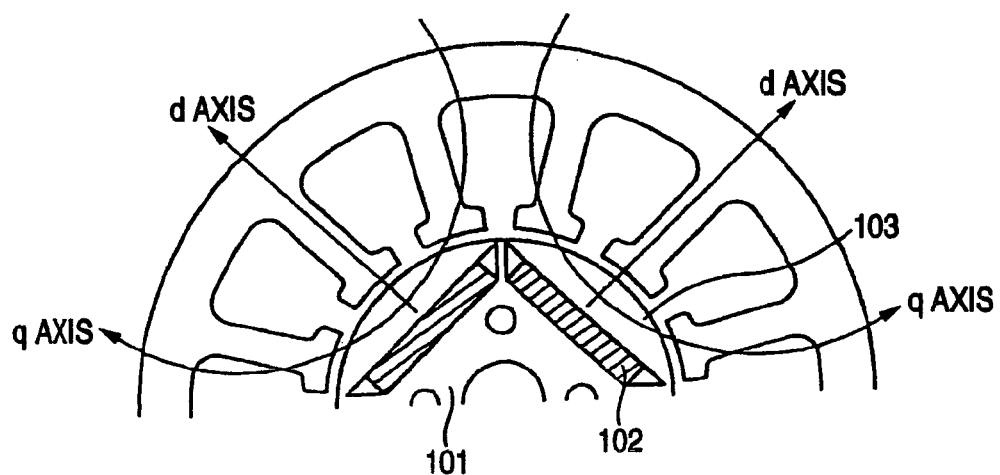
FIG. 47 is a view showing an example of a structure of a conventional brushless DC motor.
Figure 48:
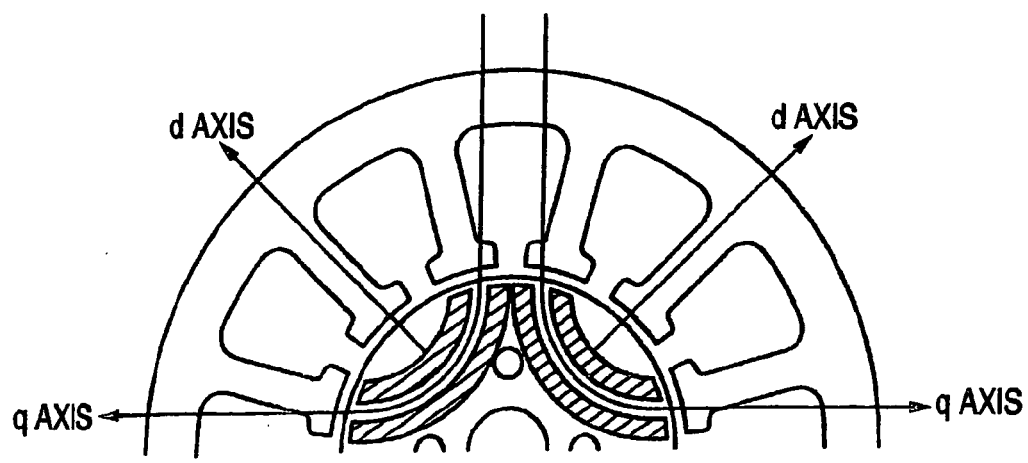
FIG. 48 is a view showing other example of a structure of a conventional brushless DC motor.
Figure 49:
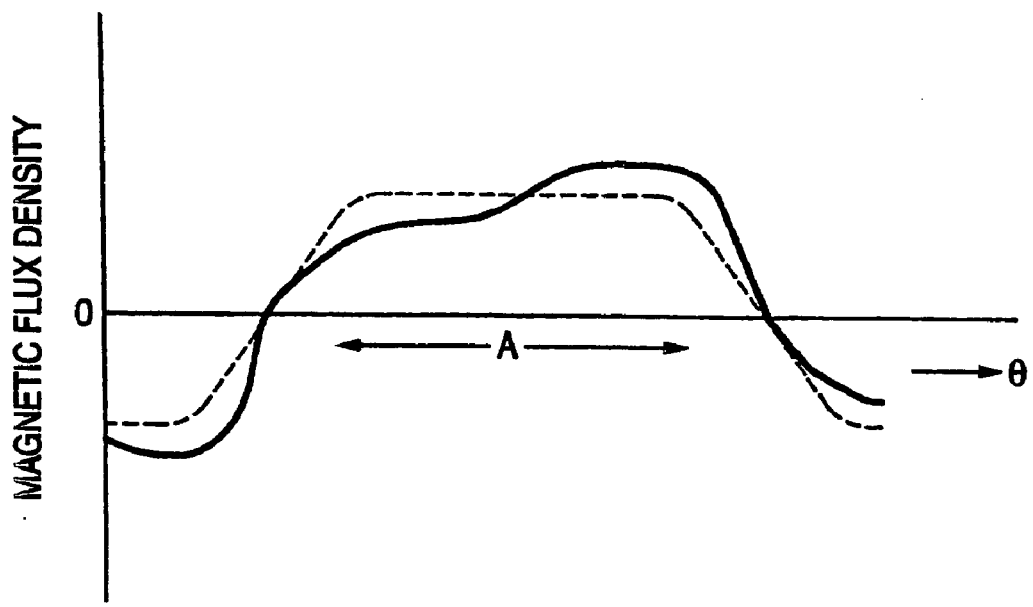
FIG. 49 is a graph showing a magnetic flux density distribution of a gap in a brushless DC motor.
Figure 50:
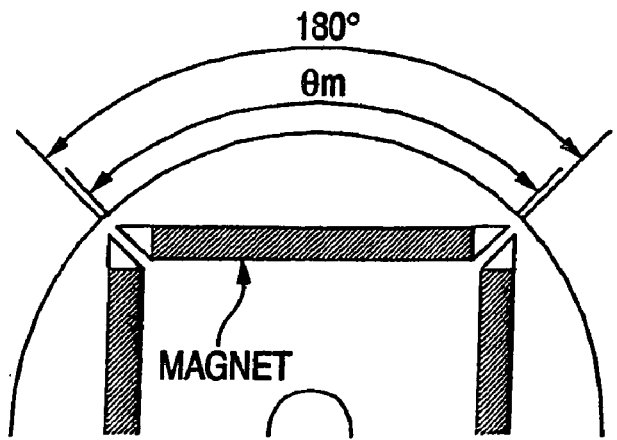
FIG. 50 is a view showing an example of a structure of a conventional brushless DC motor.

An explanation will be given how the above-described will be in the case of a structure in which a large portion of the supplementary angle of the effective magnetic pole opening angle θm is constituted by an air gap (refer to FIG. 42) for comparison. In this case, even when excitation current is applied with the above-described advance angle, the reluctance torque is not generated as predicted in FIG. 32. Because the excitation magnetic flux of the tooth 91 is difficult to be interlinked with the bridge 84 since the tooth 91 and the bridge 84 are not so much proximate to each other at a time point of starting excitation. The same goes with the case in which the effective magnetic pole opening angle θm is extremely proximate to 180° (electric angle) as shown by FIG. 47. It is known from the fact that in order to actually generate the reluctance torque as predicted in FIG. 32, it is necessary that the effective magnetic pole opening angle θm is not so much proximate to 180° (electric angle) and the large portion of the supplementary angle is occupied by the bridge 84.

Figure 43:
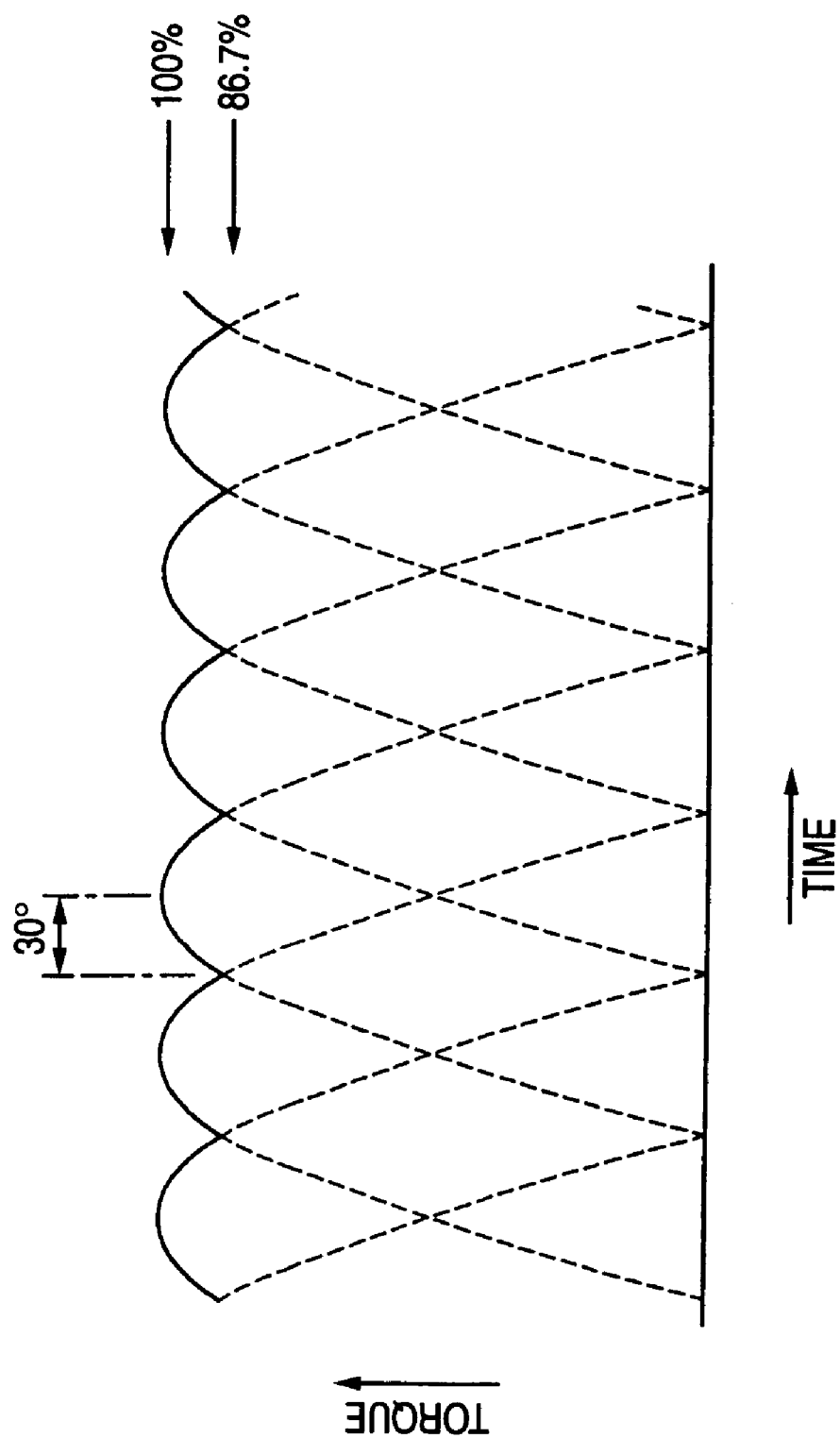
FIG. 43 is a graph showing a situation of generating a torque in the case of only a magnet torque for comparison.

The higher the rate for occupying the supplementary angle of the effective magnetic pole opening angle θm by the bridge 84, the better. Because the higher the rate, the more efficiently the excitation magnetic flux of the tooth 91 is interlinked with the bridge 84. Further, actually, the rate needs to be equal to or larger than 83.3%. The reason resides in whether pulsation of the torque can be reduced in comparison with the case of a motor rotated only by the magnet torque. That is, a torque of the motor rotated only by the magnet torque is as shown by FIG. 43 by taking an example of the case of normal three-phase driving. That is, the highest portion of the magnet torque of respective phase is the actual torque. An electric angle between a valley and a ridge of the torque is 30°. Therefore, the rate of a torque at the valley to the maximum torque is given by sin(90°–30°) and is 86.7% in percentage. In the case of only the magnet torque, the motor torque is provided with pulsation in this way. It is meaningless when the reluctance torque cannot reduce such a pulsation.

Hence, an investigation will be given of a condition for the reluctance torque to satisfy such a condition. The reluctance torque is increased and reduced at a frequency twice as much as that of the magnetic torque and is provided with peaks on both sides of a peak of the magnet torque. The reluctance torque must achieve a continuity with the magnet torque by preventing the reluctance torque from becoming smaller than 86.7%, mentioned above, relative to a torque peak having a desired magnitude. For that purpose, it is necessary that the following inequality is established with regard to an electric angle θ generated by the reluctance torque.

$$\sin(90°\pm 2\theta) \geq 0.867$$

However, both of the magnetic torque and the reluctance torque of the respective phase are constituted by a sine wave form and the peak of the reluctance torque is assumed to be 90°. In this case, attention is given only to an advancing angle and therefore, substantially, $$\sin(90°-2\theta) \geq 0.867.$$

Figure 44:
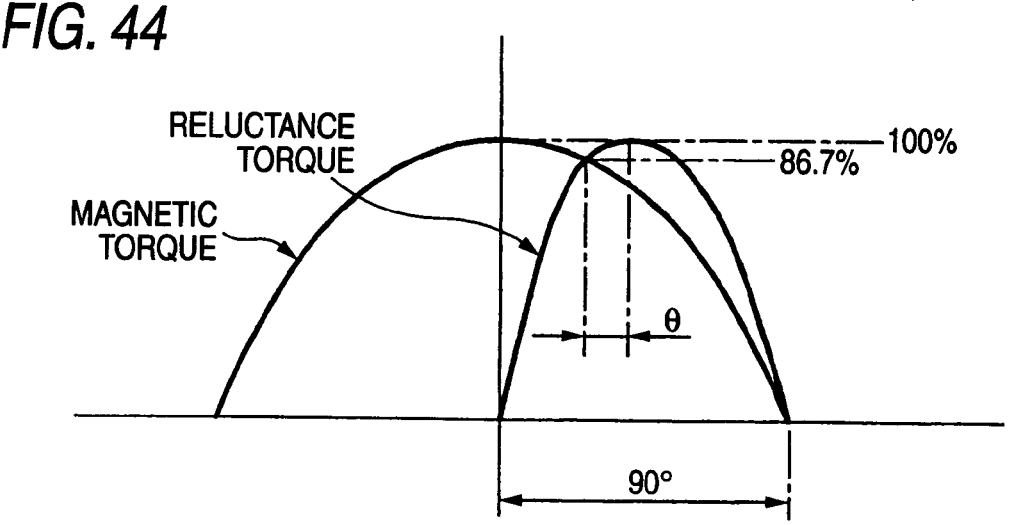
FIG. 44 is a graph showing a situation of compensating for a valley of a magnet torque by a reluctance torque.

Such a relationship between the magnetic torque and the reluctance torque is shown by FIG. 44. It is known in reference to FIG. 44 that θ establishing the above equation is as shown below.

$$\theta \leq 15°$$

When the bridge 84 occupies all of the supplementary angle of the effective magnetic pole opening angle θm, when a central position of excitation of the stator 90 (central portion of the tooth 91 when only the single tooth 91 is excited) and an end of the effective magnetic pole opening angle θm are aligned (in this case, the central position of excitation of the stator 90 and an end of the bridge 84 are also aligned), the maximum reluctance torque is achieved. The state corresponds to the peak of the reluctance torque in FIG. 44. A reduction in the rate of occupying the supplementary angle of the effective magnetic pole opening angle θm by the bridge 84, corresponds to that the peak position of the reluctance torque is moved to the left in FIG. 44. Then, when θ is equal to or smaller than 15°, the reluctance torque is equal to or larger than 86.7% of the magnetic torque. In such a range, the reluctance torque serves to reduce pulsation of torque. Therefore, the rate of occupying the supplementary angle of the effective magnetic pole opening angle θm by the bridge 84 is requested to be equal to or larger than 83.3% since $$(90°-15°)/90°=0.833.$$

Figure 45:
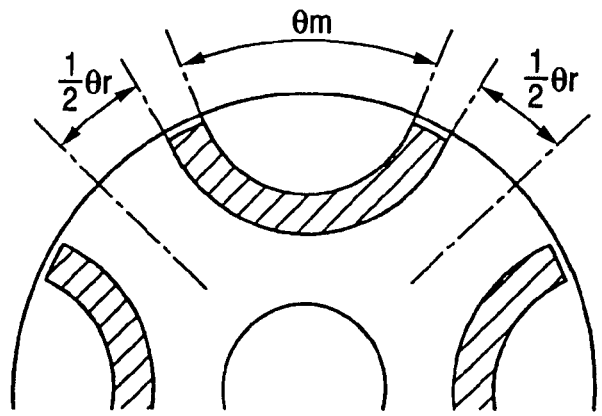
FIG. 45 is a view showing a rotor of a brushless DC motor according to a first modified example of the third embodiment.
Figure 46:
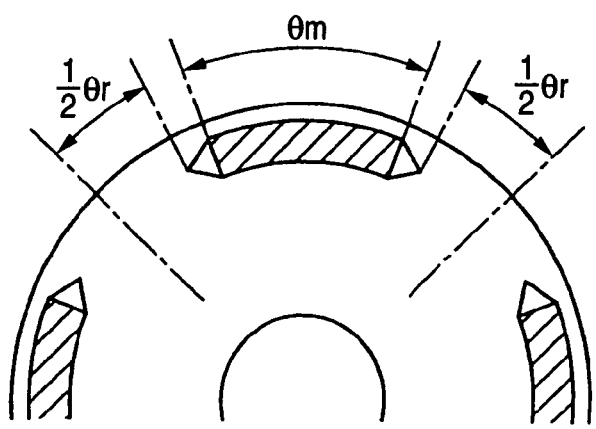
FIG. 46 is a view showing a rotor of a brushless DC motor according to a second modified example of the third embodiment.

Next, an explanation will be given of a modified example. A modified example shown in FIG. 45 is an example of using a magnet in an inversely bent shape. In this case, a considerable amount of the magnetic member is present between the magnet and the outer periphery. However, the magnetic flux related to the reluctance torque is not so much influenced by the magnetic member at the portion and therefore, the invention is applicable thereto. A modified example shown in FIG. 46 is an example of using a magnet in a substantially circular arc shape. In this case, only a small amount of the magnetic member is present between the magnet and the outer periphery. Naturally, also in this case, almost all of the magnetic flux related to the reluctance torque passes the portion of the bridge and therefore, the invention is applicable thereto.

As has been explained in details, according to the brushless DC motor of the embodiment, the effective magnetic pole opening angle θm of the magnet 81 in the rotor 80 is made to be smaller than 180° (electric angle) and is set to fall in a range from 127° (electric angle) to 173° (electric angle). Further, a large portion of the supplementary angle of the effective magnetic pole opening angle θm is occupied by the bridge 84 of the magnetic member. Therefore, the magnetic flux is easy to be interlinked with the bridge 84 from the tooth 91 and the reluctance torque can effectively be utilized. Particularly, rather stronger synthesized torque can be provided by a less amount of using the magnet in comparison with the motor in which the effective magnetic pole opening angle θm is made to be proximate to be almost 180° (electric angle).

Further, when the effective magnetic pole opening angle θm is made to be equal to or smaller than 150° even in such a range, the same synthesized torque can be achieved by a further smaller amount of using the magnet in comparison with the case in which the effective magnetic pole opening angle θm is made to be equal to or larger than 150°. Therefore, a larger effect is achieved in view of fabrication cost of the brushless DC motor. Meanwhile, when the effective magnetic pole opening angle θm is made to be equal to or larger than 150° in such a range, power consumption is made to be small in comparison with a case of making the effective magnetic pole opening angle θm equal to or smaller than 150°. Therefore, this is more advantageous in view of running cost.

Further, separate magnetic paths at a vicinity of the air gap are constituted by the magnetic flux related to the magnet torque and the magnetic flux related to the reluctance torque. Therefore, the magnetic member of the rotor 80 is provided with a low possibility of falling into magnetic saturation, which is excellent in energy efficiency. This also signifies that uniformity of the magnetic flux distribution at the air gap is excellent. Therefore, the motor is excellent also in view of motor properties, vibration and noise. Further, in driving the motor, the magnet torque and the reluctance torque are connected without gap in view of a vertical row. Therefore, pulsation of the synthesized torque is small.

Further, according to the brushless DC motor of the embodiment, by driving the motor by excitation current having an advancing phase angle of a half of the opening angle in electric angle of the bridge 84, the reluctance torque can be utilized particularly effectively. Therefore, the effective magnetic pole opening angle θm may be set in the above-described range, the opening angle of the bridge 84 may be set in conformity with the effective magnetic pole opening angle θm and the opening angle of the bridge 84 may be set as proximate to the complementary angle of the effective magnetic pole opening angle θm as possible. In this case, there may be set a rule of providing the advancing phase angle of the half of the opening angle in electric angle of the bridge 84 to the excitation current. When the rule is followed, even any of the brushless DC motor in which the effective magnetic pole opening angle θm or the opening angle of the bridge 84 are set as described above, can be driven to generate the reluctance torque efficiently.

Further, the embodiment is merely an exemplification and does not limit the invention at all. Therefore, the invention can naturally be improved or modified variously within a range not deviated from a gist thereof. For example, the pole pair number of the rotor and the shape of the magnet, the number of the teeth of the stator and the like are not limited to those exemplified. Further, although according to the embodiment, there is shown the motor of the type in which the rotor is disposed at inside of the stator, the invention is applicable also to a motor of a style in which a rotor is disposed on an outer side of the stator.

As is apparent from the above-described explanation, according to the invention, there is provided the brushless DC motor capable of achieving necessary torque even when the magnets are not so much used and alleviating the problem of magnetic saturation and the problem of nonuniformity of the magnetic flux density. Further, there is provided a driving method capable of driving the brushless DC motor according to the invention efficiently by the unified rule. Further, the brushless Dc motor and the method of driving the same according to the invention, particularly achieves a significant advantage when used in a motor for driving an electric power steering apparatus, a capstan or the like.

What is claimed is:

1. A brushless DC motor utilizing a reluctance torque comprising:
    a rotor comprising magnets,
    wherein an effective magnetic pole opening angle in an air gap of the rotor falls in a range specified by two conditions of an upper limit of 173° and a lower limit of 127° in electric angles, wherein the rotor comprises a bridge for connecting an inner periphery and an outer periphery of the magnet by a magnetic member at a position other than the effective magnetic pole opening angle in the rotor, and wherein an opening angle in an electric angle of the bridge is not smaller than about 83.3% of a complementary angle in an electric angle of the effective magnetic pole opening angle in the rotor.

2. The brushless DC motor according to claim 1, wherein the upper limit is 161° and a lower limit is 139° in electric angles.

3. The brushless DC motor according to claim 1, wherein the motor is driven by an excitation current having a phase angle advanced relative to a phase of an induced voltage, and an advancing angle of the phase of the current relative to the phase of the induced voltage falls in a range in which a center of the range is defined by a half of the opening angle in the electric angle of the bridge and a width of the range is defined by an opening angle in an electric angle of a width of a tooth constituting an excitation center of a reluctance torque.

4. The motor of claim 1, further comprising a stator comprising teeth having widened portions at tips at a front end of the teeth, wherein the opening angle includes said tips.

5. The motor of claim 1, further comprising a stator comprising teeth having narrowed portions at tips at a front end of the teeth, wherein the opening angle comprises other than said tips.

6. The motor of claim 1, wherein said magnets have a linear shape.

7. The motor of claim 1, wherein said magnets have an inversely bent shape.

8. The motor of claim 1, wherein said magnets have a circular arc shape.

9. The motor of claim 1, wherein the effective magnetic pole opening angle is equal to or smaller than 150°.

10. The motor of claim 1, wherein the effective magnetic pole opening angle is equal to or larger than 150°.

* * * * *